United States Patent
Espinosa

(10) Patent No.: US 9,702,139 B2
(45) Date of Patent: Jul. 11, 2017

(54) CONCRETE ANCHOR COUPLING ASSEMBLY AND ANCHOR ROD HOLDER

(71) Applicant: Thomas M. Espinosa, Snohomish, WA (US)

(72) Inventor: Thomas M. Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 0 days.

(21) Appl. No.: 14/944,716

(22) Filed: Nov. 18, 2015

(65) Prior Publication Data

US 2016/0069065 A1    Mar. 10, 2016

Related U.S. Application Data

(62) Division of application No. 13/424,082, filed on Mar. 19, 2012, now Pat. No. 9,222,251.

(Continued)

(51) Int. Cl.
*E04B 1/38* (2006.01)
*E04C 5/00* (2006.01)
(Continued)

(52) U.S. Cl.
CPC .......... *E04B 1/4121* (2013.01); *B28B 23/005* (2013.01); *B28B 23/0056* (2013.01);
(Continued)

(58) Field of Classification Search
CPC ........ E04B 1/40; E04B 1/4114; E04B 1/4121; E04B 1/4128; E04B 1/4135; E04B 1/4157; E04G 21/185; E04G 21/142; E04G 21/167; F16B 13/066

USPC ......... 52/698, 699, 700, 701, 704, 705, 706, 52/707, 125.4, 125.5, 126.4, 126.7, 295, 52/296; 248/545, 530, 156, 353; 411/105, 107, 108, 123, 133, 135, 147, 411/172, 187, 442, 469, 474

See application file for complete search history.

(56) References Cited

U.S. PATENT DOCUMENTS

| | | |
|---|---|---|
| 991,517 A | 5/1911 | Kennedy |
| 1,045,562 A | 11/1912 | Kennedy |
| (Continued) | | |

FOREIGN PATENT DOCUMENTS

| | | |
|---|---|---|
| WO | 2010/090736 | 8/2010 |
| WO | 2010/090748 | 8/2010 |

OTHER PUBLICATIONS

Chainring Construction Products LLC, www.ptanchor.com, Copyright 2009 Home, PT Anchor, Concept and Cut Sheet pages.

(Continued)

*Primary Examiner* — Chi Q Nguyen
(74) *Attorney, Agent, or Firm* — Shlesinger, Arkwright & Garvey LLP

(57) ABSTRACT

Concrete coupling assembly comprises a base holder for being attached to a concrete forming surface, the base holder including a central opening; a coupler having one end disposed within the central opening, the coupler having an axis for being positioned substantially transverse to the forming surface, the coupler having first and second threaded bores through the one end for attachment of a threaded rod; and a separate anchor body threadedly attached to another end of the coupler.

21 Claims, 38 Drawing Sheets

Related U.S. Application Data

(60) Provisional application No. 61/454,311, filed on Mar. 18, 2011.

(51) Int. Cl.

| | | |
|---|---|---|
| *E04B 1/41* | (2006.01) | |
| *B28B 23/00* | (2006.01) | |
| *E04G 21/18* | (2006.01) | |
| *F16B 13/06* | (2006.01) | |
| *E04G 21/14* | (2006.01) | |
| *E04G 21/16* | (2006.01) | |

(52) U.S. Cl.
CPC .......... *E04B 1/4128* (2013.01); *E04B 1/4157* (2013.01); *E04B 1/4171* (2013.01); *E04G 21/185* (2013.01); *E04B 1/40* (2013.01); *E04B 1/4114* (2013.01); *E04B 1/4135* (2013.01); *E04G 21/142* (2013.01); *E04G 21/167* (2013.01); *F16B 13/066* (2013.01)

(56) References Cited

U.S. PATENT DOCUMENTS

| | | |
|---|---|---|
| 1,185,765 A | 6/1916 | Brooks |
| 1,264,189 A | 4/1918 | Keator |
| 1,447,515 A | 3/1923 | Miller |
| 1,918,378 A | 7/1933 | Burnham |
| 1,940,545 A | 12/1933 | Holmes |
| 2,625,815 A | 1/1953 | Black |
| 2,689,987 A | 9/1954 | Berger |
| 3,157,966 A | 11/1964 | Sherburne |
| 3,224,591 A | 12/1965 | Sawyer |
| 3,391,514 A | 7/1968 | Hall, Jr. |
| 3,405,497 A | 10/1968 | McNair |
| 3,443,351 A | 5/1969 | Michio |
| 3,509,670 A | 5/1970 | Boll et al. |
| 3,514,917 A | 6/1970 | Merrill, Sr. |
| 3,517,470 A | 6/1970 | Luebkeman |
| 3,540,762 A | 11/1970 | Dunlap |
| 3,579,938 A | 5/1971 | Hanson |
| 3,782,061 A | 1/1974 | Minutoli et al. |
| 3,867,804 A | 2/1975 | Wilson |
| 3,884,004 A | 5/1975 | Douma et al. |
| 3,927,497 A | 12/1975 | Yoshinaga et al. |
| 3,935,685 A | 2/1976 | Howlett |
| 4,000,591 A | 1/1977 | Courtois |
| 4,007,564 A * | 2/1977 | Chisholm ................ E04H 12/22 403/186 |
| 4,017,115 A * | 4/1977 | Holt ...................... E04G 21/142 294/86.4 |
| 4,169,569 A | 10/1979 | Riegler et al. |
| 4,195,709 A | 4/1980 | Gianotti et al. |
| 4,239,489 A | 12/1980 | Ellmas et al. |
| 4,287,807 A | 9/1981 | Pacharis et al. |
| 4,325,575 A | 4/1982 | Holt et al. |
| 4,408,940 A | 10/1983 | Fischer |
| 4,650,276 A | 3/1987 | Lanzisera et al. |
| 4,945,704 A | 8/1990 | Brown, Jr. |
| 5,081,811 A | 1/1992 | Sasaki |
| 5,085,547 A | 2/1992 | Vanotti |
| 5,205,690 A | 4/1993 | Roth |
| 5,315,800 A * | 5/1994 | Weber ................... E04B 1/4157 411/82 |
| 5,375,384 A | 12/1994 | Wolfson |
| 5,641,256 A | 6/1997 | Gundy |
| 5,653,078 A | 8/1997 | Kies et al. |
| 5,653,563 A | 8/1997 | Ernst et al. |
| 5,740,651 A | 4/1998 | Vanotti |
| 5,746,556 A * | 5/1998 | Sato ....................... F16B 13/066 411/40 |
| 5,772,372 A | 6/1998 | Lins et al. |
| 6,079,179 A | 6/2000 | Shoemaker, Jr. |
| 6,161,339 A | 12/2000 | Cornett et al. |
| 6,195,949 B1 | 3/2001 | Schuyler |
| 6,240,697 B1 | 6/2001 | Thompson et al. |
| 6,341,452 B1 | 1/2002 | Bollinghaus |
| 6,350,093 B1 | 2/2002 | Petersen et al. |
| 6,367,205 B2 | 4/2002 | Cornett, Sr. |
| 6,513,300 B1 | 2/2003 | James |
| 6,904,728 B2 | 6/2005 | Stutts |
| 6,964,115 B2 | 11/2005 | Kim |
| 7,093,400 B1 | 8/2006 | Thompson et al. |
| 7,144,530 B2 | 12/2006 | Ward et al. |
| 7,150,132 B2 | 12/2006 | Commins |
| 7,174,679 B1 | 2/2007 | Mueller |
| 7,296,382 B2 | 11/2007 | Sack |
| 7,445,192 B2 | 11/2008 | Gridley et al. |
| 7,752,824 B2 | 7/2010 | Brown et al. |
| 7,766,299 B2 | 8/2010 | Titus et al. |
| 7,946,086 B2 | 5/2011 | Hammer et al. |
| 7,971,411 B2 | 7/2011 | Commins |
| 9,062,452 B2 * | 6/2015 | Espinosa ............... E04B 1/4171 |
| 9,097,001 B2 * | 8/2015 | Espinosa ............... E04B 1/2604 |
| 9,222,251 B2 * | 12/2015 | Espinosa ............... E04B 1/4121 |
| 2002/0189175 A1 | 12/2002 | Lancelot et al. |
| 2005/0055897 A1 | 3/2005 | Commins |
| 2010/0290859 A1 | 11/2010 | Noce et al. |
| 2011/0041449 A1 | 2/2011 | Espinosa |
| 2011/0041450 A1 | 2/2011 | Espinosa |
| 2011/0192111 A1 | 8/2011 | White et al. |

OTHER PUBLICATIONS

International Preliminary Report on Patentability, The International Bureau of WIPO, PCT/EP2012/029690, Oct. 3, 2013.

* cited by examiner

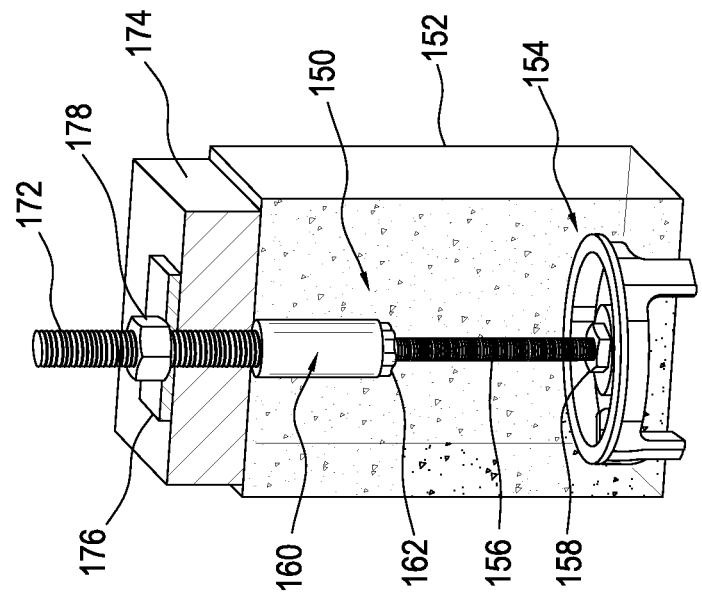
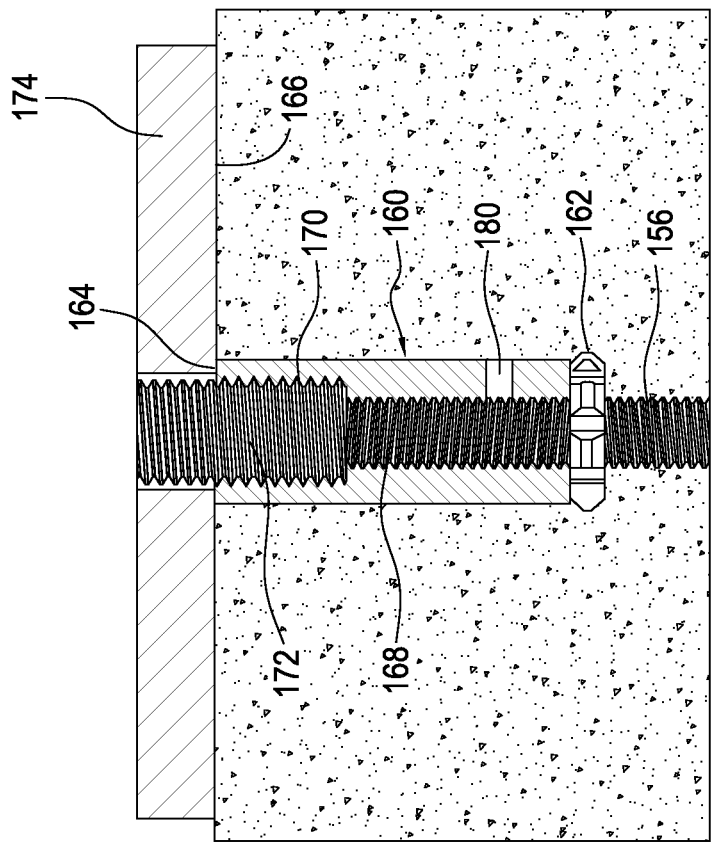

CONCRETE ANCHOR COUPLING ASSEMBLY AND ANCHOR ROD HOLDER

RELATED APPLICATION

This is a divisional application of application Ser. No. 13/424,082, filed on Mar. 19, 2012, now U.S. Pat. No. 9,222,251, which is a nonprovisional application claiming the priority benefit of provisional application Ser. No. 61/454,311, filed on Mar. 18, 2011, both applications hereby incorporated by reference.

FIELD OF THE INVENTION

The present invention relates generally to concrete anchors and in particular to an anchor coupling assembly and anchor rod holder embedded in concrete.

SUMMARY OF THE INVENTION

The present invention provides a concrete coupling assembly comprising a base holder for being attached to a concrete forming surface, the base holder including a central opening; a coupler having one end disposed within the central opening, the coupler having an axis for being positioned substantially transverse to the forming surface, the coupler having first and second threaded bores through the one end for attachment of a threaded rod; and a separate anchor body threadedly attached to another end of the coupler.

Means are provided to prevent entry of the concrete slurry into the threaded bores during concrete pour. The means may include providing the one end of the coupler with a beveled end so as to indent the formboard to form a seal; or a cap to seal the bores from the concrete slurry; or a deformable, crushable or pliable skirt around the bottom of the central opening so as to form a seal on the formboard when the base holder is attached to the formboard. The arm portions have foot or ridge portions underneath that elevate the arm portions above the formboard. The height of the skirt is taller than the height of the ridge portions so that when the ridge portions are pressed down to the formboard with securing hardware the skirt is deformed to form a seal with the formboard.

The base holder has a central portion including the central opening and a base portion, which may be circular or comprises a plurality of arm portions extending outwardly and radially from a bottom portion of the central portion. The central portion has a tubular wall that rises above the base portion to support and stabilize the coupler. Vertical rib portions may be provided that extend outwardly radially from the tubular wall. The central opening includes a cylindrical surface on which a thread is disposed adapted to engage a threaded end portion of the anchor body. The thread may be continuous or segmented. A channel runs vertically on the cylindrical surface and horizontally across the top edge of the tubular wall that provides a passageway for air that may be trapped inside the central opening to escape.

A stop member may be provided that extends into the central opening at the bottom of the central opening to prevent the bottom edge of the coupler from extending beyond the bottom of the central opening. The stop member may be used where the cap or skirt is used to block the concrete slurry from the bores.

The bottom of the arm portions are hollowed or recessed that communicates with holes to allow air escape during concrete pour.

The coupler may be cylindrical or hexagonal.

The anchor body may be made of a standard bolt or a length of a threaded rod. The anchor body may also be made of a threaded rod and a body threaded to the rod. The body may be a hexagonal nut or a tapered body disposed wide to narrow toward the base holder. The tapered body includes a flange at the wider portion.

Another tapered body may be threaded to the rod and be disposed near the coupler and oriented from wide to narrow in a direction away from the base holder. This arrangement anchors a load that tends to pull the rod in a direction away from the base holder, while at the same time able to resist another load pulling in the opposite direction.

The coupler may also be a split nut that tends to spread apart when a threaded rod is inserted in one direction and contracts to grip the rod when the inserting motion stops. The split nut may include a flange head.

The present invention also provides a concrete anchor coupling assembly, comprising a base holder for being attached to a concrete forming surface, the base holder including a threaded central opening, the base holder being molded in one piece; a threaded rod with one end being attached to the threaded central opening; and a coupler having one end threaded to another end of the threaded rod, the coupler having another end for being accessible with respect to a concrete surface after the concrete is poured. A nut may be provided to lock the coupler to the rod. The coupler has multiple concentric threaded bores of different diameters, preferably a smaller diameter bore threadedly connected to the threaded rod and a larger diameter bore at the other end of the coupler that is accessible, such as being flush, with respect to a concrete surface for threaded connection to a tie-rod. The coupler may include a radial hole at an intermediate portion of one of the bores. The base holder may be provided with downwardly extending legs. An anchor member, such as a nut or other shaped body, such as a tapered body, is provided as an anchor, threadedly secured to a bottom portion of the rod and engaging the base holder.

The base holder may be used as an anchor rod holder. Leg portions may be added that elevate the arm portions above the formboard a certain distance. The leg portions extend downwardly from the end portions of the arm portions. The leg portions may be solid that extend directly downwardly, or hollow that extend outwardly and downwardly at an angle. The hollow leg portions have a U-shaped cross-section. Foot portions may be provided at the bottom of the leg portions for receiving securing hardware, such as nails, screws, etc.

The present invention is also directed to an anchor rod holder for being attached to a concrete forming surface, the rod holder including a threaded central opening for mating with a threaded end portion of the rod. The holder has a central portion including the central opening and a base portion, which may be circular or comprises a plurality of arm portions extending outwardly and radially from a bottom portion of the central portion. A stop member may be provided that extends into the central opening at the bottom of the central opening to prevent the bottom edge of the rod from extending beyond the bottom of the central opening. The stop member may extend across the central opening and may include an opening for receiving therethrough a securing hardware, such as a nail, screw, etc. The central portion has a tubular wall that rises above the base portion. Ribs may be included to the outside of the tubular wall. Leg portions may be added that elevate the arm portions above the formboard a certain distance. The leg portions extend downwardly from the end portions of the arm portions. The leg portions may be solid that extend directly downwardly, or hollow that extend outwardly and downwardly at an angle. The hollow leg portions have a U-shaped cross-section. Foot portions may be provided at the bottom of the leg portions for receiving securing hardware, such as nails, screws, etc.

The present invention further provides a concrete anchor coupling assembly, comprising a base holder for being attached to a concrete forming surface, the base holder including a threaded central opening, the base holder is molded in one piece; a threaded rod with one end being attached to the threaded central opening; and a coupler having one end threaded to another end of the threaded rod, the coupler having another end for being accessible with respect to a concrete surface after the concrete is poured.

The present invention also provides a concrete anchor coupling assembly, comprising a base holder for being attached to a concrete forming surface, the base holder including a central opening; a threaded rod with one end being attached to the central opening; a coupler having one end threaded to another end of the threaded rod, the coupler having another end for being accessible with respect to a concrete surface after the concrete is poured; and the coupler including a smaller diameter bore threadedly connected to the another end of the threaded rod and a larger diameter bore at the another of the coupler.

The present invention further provides a concrete anchor coupling assembly, comprising a base holder for being attached to a concrete forming surface, the base holder including a central opening, the base holder is molded in one piece; a threaded rod with one end being attached to the central opening; the base holder including a stop member extending into the central opening at a bottom of the central opening to prevent a bottom edge of the rod from extending beyond the bottom of the central opening; and a coupler having one end threaded to another end of the threaded rod, the coupler having another end for being accessible with respect to a concrete surface after the concrete is poured.

The present invention also provides an anchor rod holder for being attached to a concrete forming surface, the anchor rod holder comprising a body having a central portion including a threaded central opening and a base portion; the threaded central opening for mating with a threaded end portion of a rod; and a stop member extending into the central opening at a bottom of the central opening to prevent a bottom edge of the rod from extending beyond the bottom of the central opening.

The present invention also provides an anchor rod holder for being attached to a concrete forming surface, the anchor rod holder comprising a body molded in one piece and having a central portion including a threaded central opening and a base portion; the threaded central opening for mating with a threaded end portion of a rod; and the central portion including an upwardly extending tubular wall to support and stabilize the rod.

The present invention also provides a concrete anchor coupling assembly, comprising a base holder for being attached to a concrete forming surface, the base holder including a threaded central opening; an anchor coupler having a body portion and a head portion, the body portion including a longitudinal axis and a first threaded bore along the axis, the head portion including a shoulder portion extending substantially transversely to the longitudinal axis of the body portion; and the body portion having an end portion being disposed within the threaded central opening, the end portion having outside threads for threaded engagement with the threaded central opening.

The present invention further provides a concrete anchor coupling assembly, comprising a base holder for being attached to a concrete forming surface, the base holder including central opening; an anchor coupler having a body portion and a head portion, the body portion including a longitudinal axis and a first threaded bore along the axis, the head portion including a shoulder portion extending substantially transversely to the longitudinal axis of the body portion; the body portion having an end portion being disposed within the central opening; the base holder including a stop member at a bottom of the central opening and extending into the central opening to prevent a bottom edge of the end portion from extending beyond the bottom of the central opening; a removable cap having a threaded stem and a flange, the threaded stem is threadedly attached to the first threaded bore; and the stop member is sandwiched between the bottom edge and the flange.

BRIEF DESCRIPTION OF THE DRAWINGS

FIG. 21 is a perspective view of a concrete anchor assembly that uses a coupling with multi-size threaded bores where the coupling is accessible, such as being flush, with respect to the top of the concrete structure.

FIG. 22 is a cross-sectional view of a portion of the assembly of FIG. 21, showing the internal structure of the coupling.

DETAILED DESCRIPTION OF THE INVENTION

Figure 1:
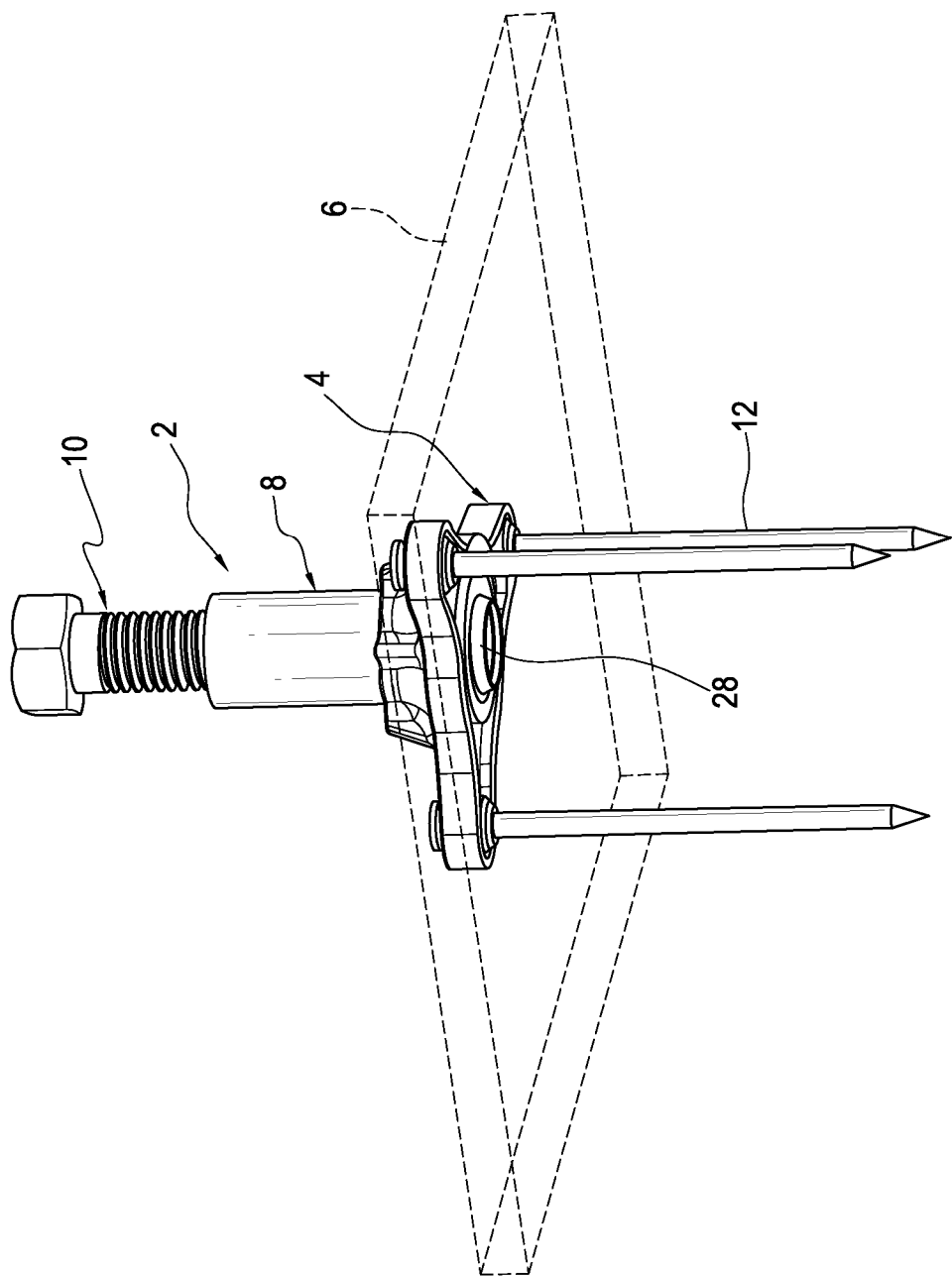
FIG. 1 is perspective view of a concrete coupling assembly embodying the present invention.

A coupling assembly 2 embodying the present invention is disclosed in FIG. 1. The coupling assembly 2 comprises a base holder 4 for attachment to a concrete formboard 6, a coupler 8 and an anchor body 10, such as a standard bolt, a length of threaded rod, or any standard anchor body known to provide anchorage in concrete. The base holder 4 may be attached to the formboard 6 with nails 12, screws, staples, or other standard hardware. The coupler 8 is positioned substantially transverse to the plane of the forming surface of the formboard. After concrete that has been poured onto the formboard 6 has dried, the formboard is removed, exposing one end of the coupler 8 for threadingly receiving a threaded rod to be attached to a load. The formboard 6 has a forming surface on which the base holder 4 is placed. The formboard 6 may be made of wood, sheet metal or any suitable material for providing a form into which concrete is poured.

Figure 2:
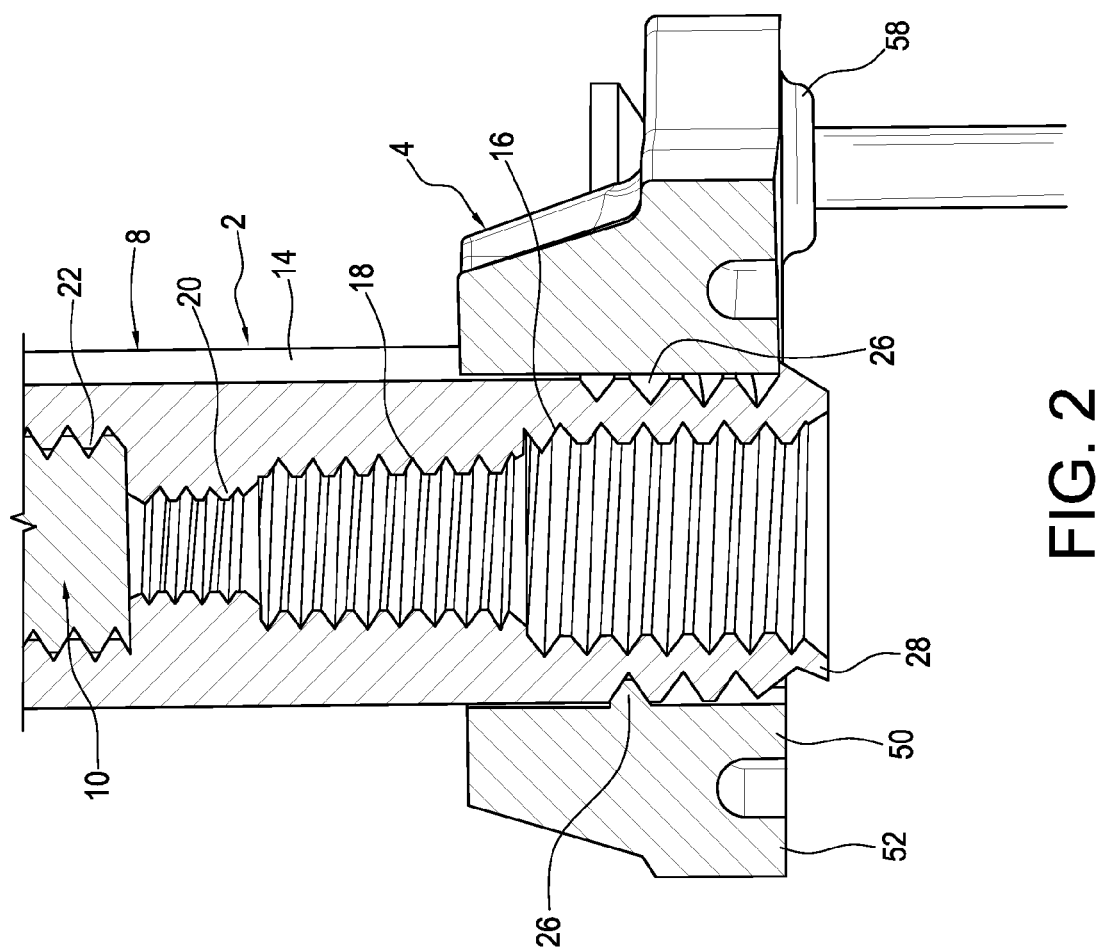
FIG. 2 is a perspective with portions shown in cross-section of the coupling assembly of FIG. 1.
Figure 3:
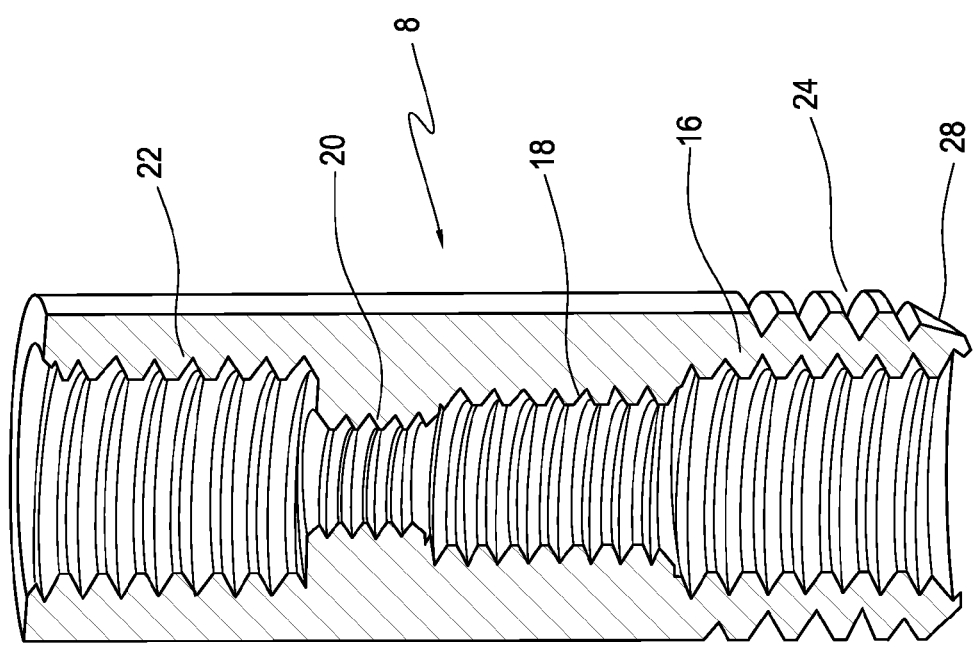
FIG. 3 is a perspective and cross-section view of a coupling used in the coupling assembly of FIG. 1.

Referring to FIGS. 2 and 3, the coupler 8 has an outer cylindrical surface 14 and a plurality of concentric threaded axial bores 16, 18, 20 and 22. The axial bores 16 and 22 may have the same inside diameter and thread type while axial bores 16, 18 and 20 have different inside diameters. Accordingly, different size and type of threads are made available after the concrete is poured, for example, standard UNC thread and metric threads. Different thread sizes within the coupler 8 advantageously provide one assembly with many applications. The different size axial bores advantageously provide the flexibility of using different size anchor rods that can be connected to the coupler 8. This helps to avoid incorrect hardware placement within the concrete. Tapered threads may also be included in the coupler 8 for threadedly receiving a tapered threaded rod. The bores progress from large to small starting at the bottom of the coupler 8.

The end portion of the coupler 8 has male threads 24 designed to mate with female thread portions 26 in the base holder 4. The number of the threads 24 allows an edge portion 28 of the coupler 8 to extend beyond the bottom of the base holder 4 in order to make a substantially circumferential contact with the forming surface of the formboard 6 when the base holder 4 is nailed to the formboard 6, thereby substantially sealing the axial bores from the concrete slurry during the concrete pour. The edge portion 28 is beveled or ramped to provide a relatively thinner edge surface configured to cut or indent the forming surface of the formboard to create a seal for the bores 16, 18 and 20 from the concrete slurry. The smaller bore 20 is advantageously available for threadedly receiving a smaller diameter anchor body 10, if needed.

Figure 4:
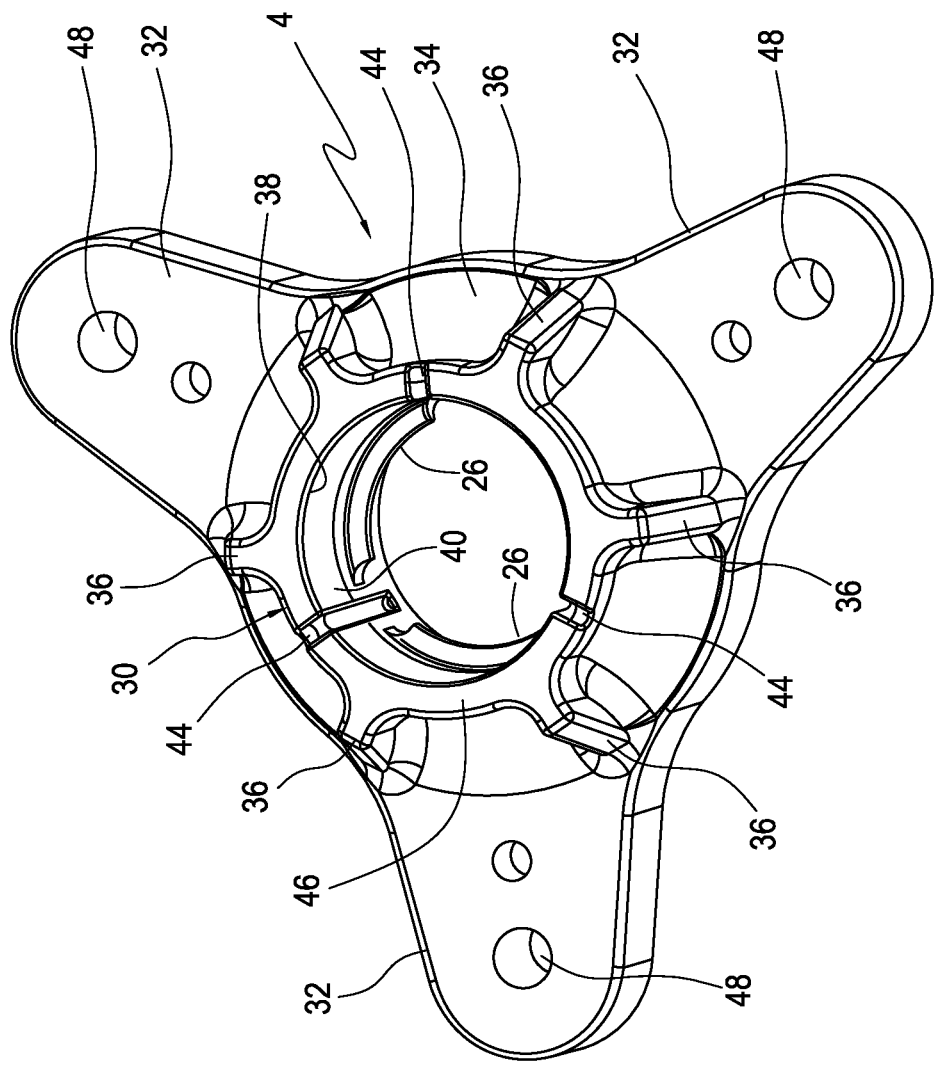
FIG. 4 is a top perspective view of a base holder used in the coupling assembly of FIG. 1.

Referring to FIG. 4, the base holder includes a raised central portion 30 and a plurality of outwardly extending arm portions 32 extending from the bottom portion 34. The central portion 30 is substantially tubular that rises above the arm portions 32. The central portion 30 has tubular wall with rib portions 36 on the outside, extending outwardly radially therefrom and vertically from the arm portions 32. The tubular wall extends upwardly to support and stabilize the coupler 8. The central portion includes an opening 38 with a cylindrical inner surface 40. Thread portions 26 extend from the surface 40 and define substantially one revolution adapted to mate with the male threads 24 on the coupler 8. Vent channels 44 are disposed vertically on the surface 40 and across the top edge 46 of the central portion 30. The vent channels 44 advantageously provide passageways for any air that may be trapped in the valleys of the threads 24 or below the coupler 8 to escape. Holes 48 are used for the nails 12, screws or other attaching hardware. The bottom of the opening 38 has a circumferential wall 50. The outer edge of the bottom portion 34 and the arm portions 32 include a peripheral wall 52. A recessed area 54 is defined between the walls 50 and 52 that communicates with openings 56. The bottom portion of each of the openings 48 includes a circumferential ridge or foot portion 58 that extends beyond and below the bottom surface 60 of the wall 52. The bottom surface 62 of the wall 50 is preferably aligned with the bottom surface 60.

Figure 6:
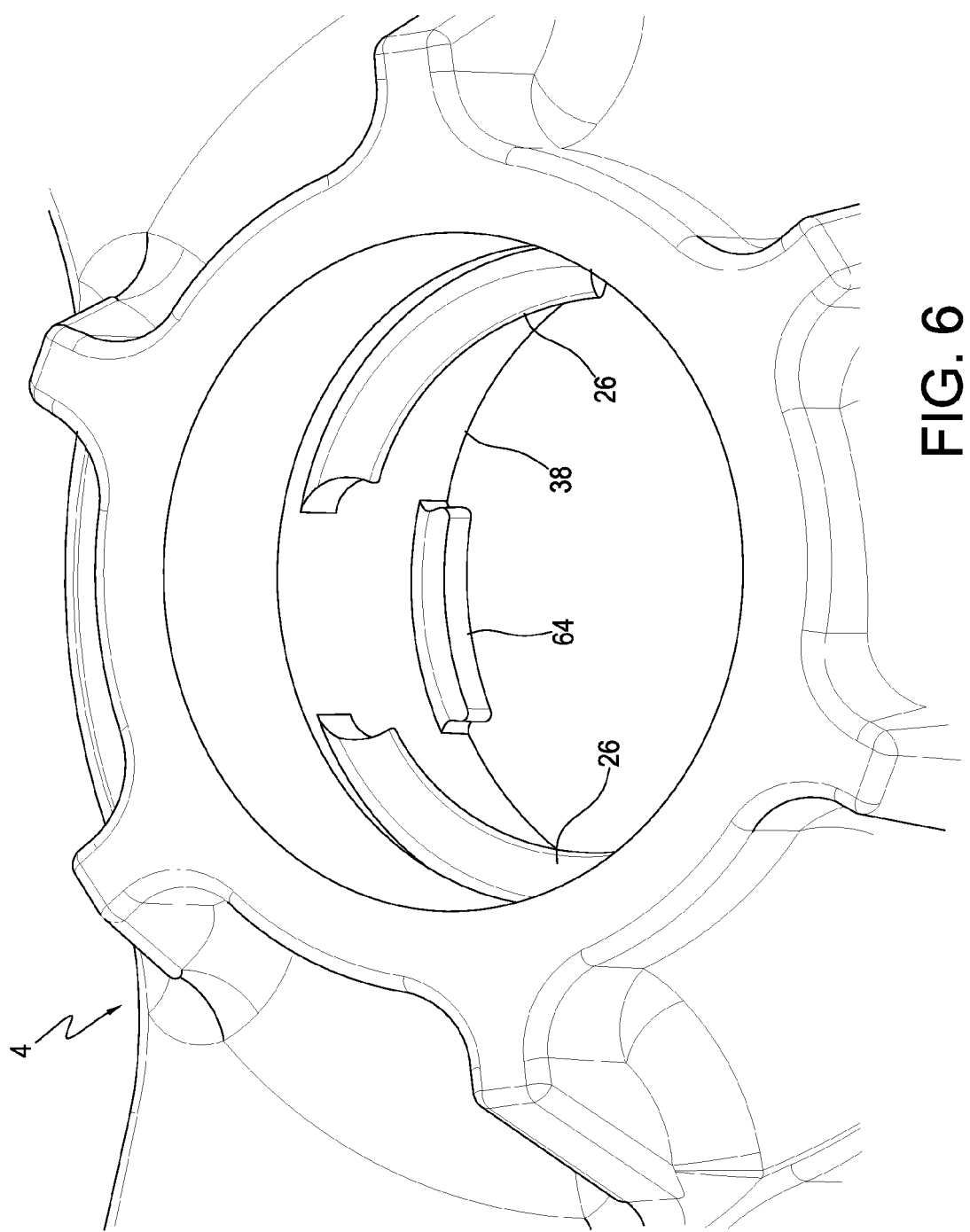
FIG. 6 is an enlarged perspective view of a portion of another embodiment of the base holder of FIG. 4 that includes a stop member.

Referring to FIG. 6, the base holder 4 may be provided with stop member 64 disposed at the bottom of the opening 38 where the edge portion 28 of the coupler 8 is not required to extend beyond the bottom surface 62 of the wall 50. The stop member 64 extends into the opening 38. The stop member 64 is preferably disposed below the gap the opposite ends of the thread portions 26. There are two additional stop members 64 that are provided substantially equally spaced around the bottom of the opening 38, although they are not visible in the drawing.

Figure 7:
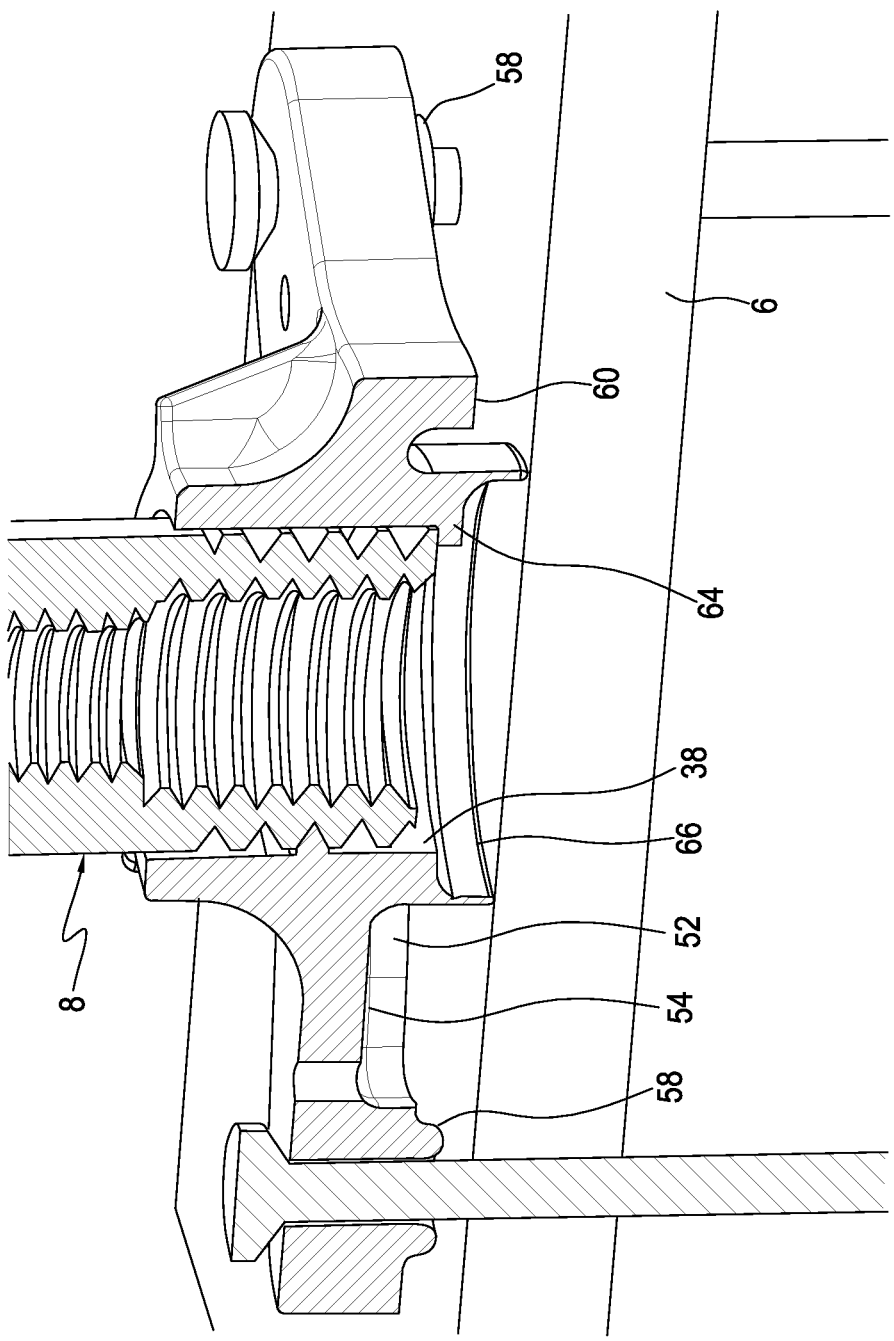
FIG. 7 is an enlarged perspective view, with portions shown in cross-section, of a portion of another embodiment of the base holder of FIG. 4 that includes a deformable skirt for sealing with the forming surface of a formboard.
Figure 8:
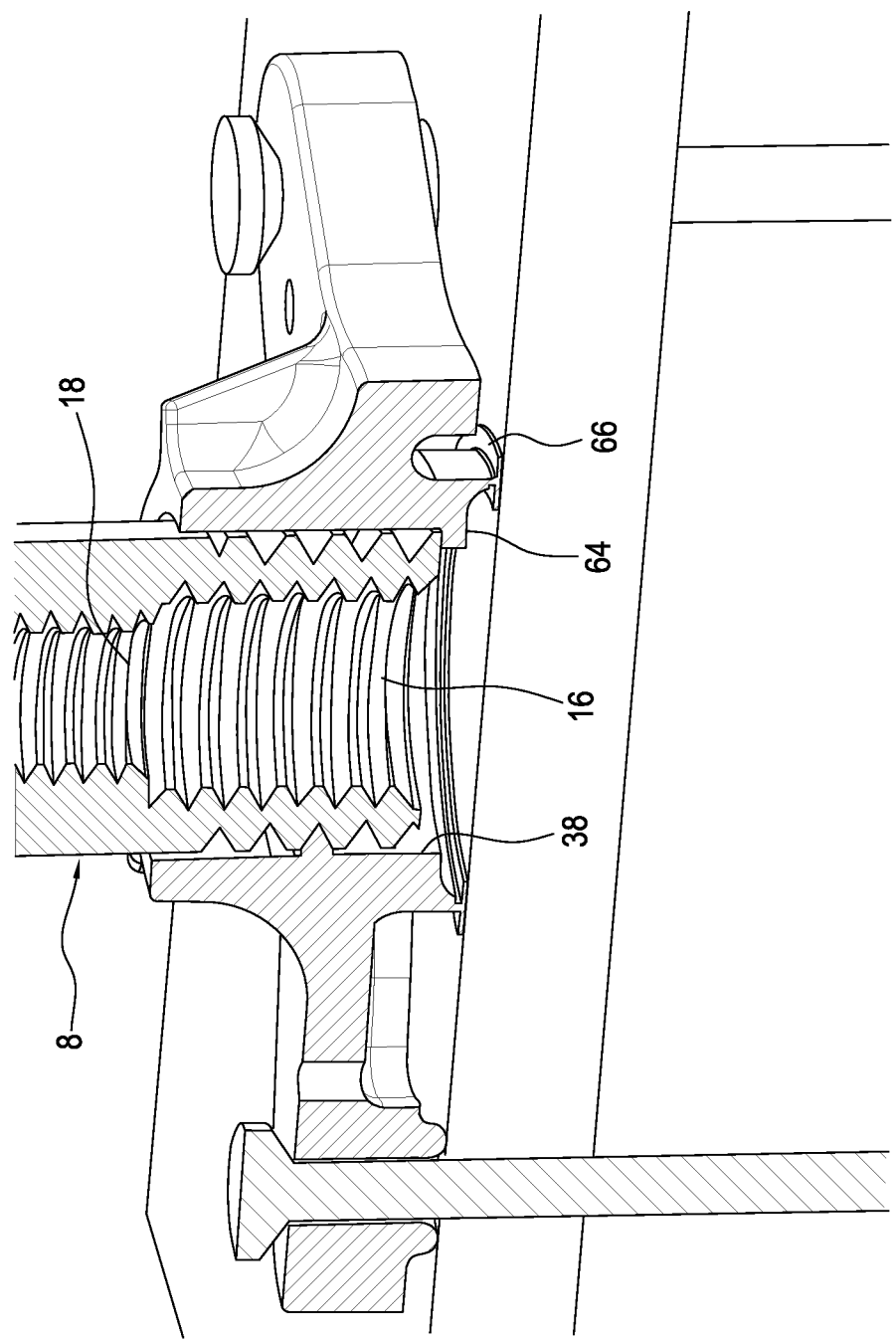
FIG. 8 is similar to FIG. 7, showing the deformable skirt forming a seal with the forming surface of a formboard.

Referring to FIG. 7, the base holder 4 shown in FIG. 6 has a continuous skirt 66 around the bottom of the opening 38. The skirt 66 is advantageously deformable, crushable or pliable. The skirt 66 is taller than the than the height of the annular ridges 58 so that the bottom edge of the skirt 66 engages the forming surface of the formboard before the ridges 58, as shown in FIG. 7. When the nails 12 are driven further toward the formboard to engage the ridges 58 against the formboard surface, the skirt 66 is deformed and flattened against the formboard surface, forming a seal around the opening 38 to prevent wet concrete from going up into the bores 16, 18 and 20. The pressure from nailing or screwing the base holder to the formboard deforms the skirt 66 to form a seal.

The coupler 8 may be attached to the base holder 4 by other means, such by being bonded to the base holder 4 during the molding process of the base holder 4, in lieu of a threaded connection. Friction fit or gluing may also be used.

Figure 9:
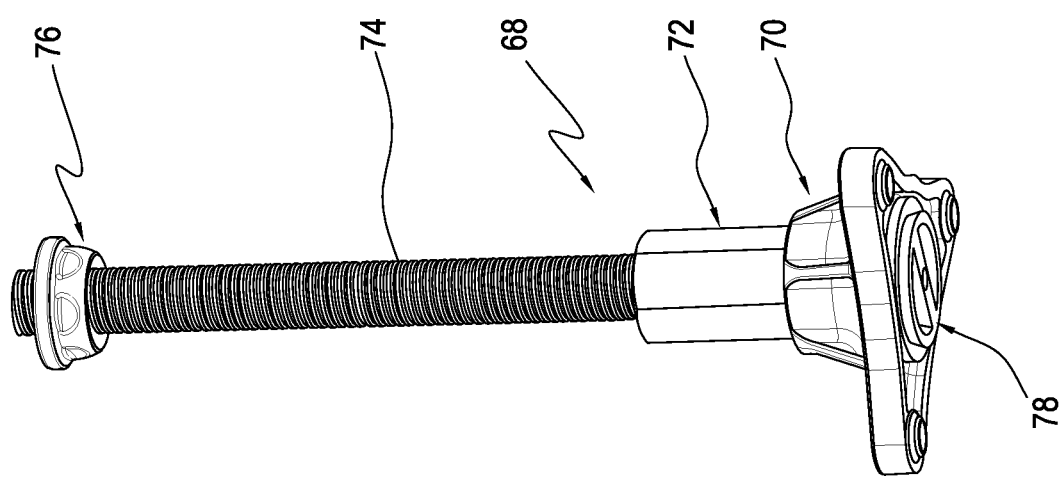
FIG. 9 is a perspective view of another embodiment of a coupling assembly embodying the present invention
Figure 10:
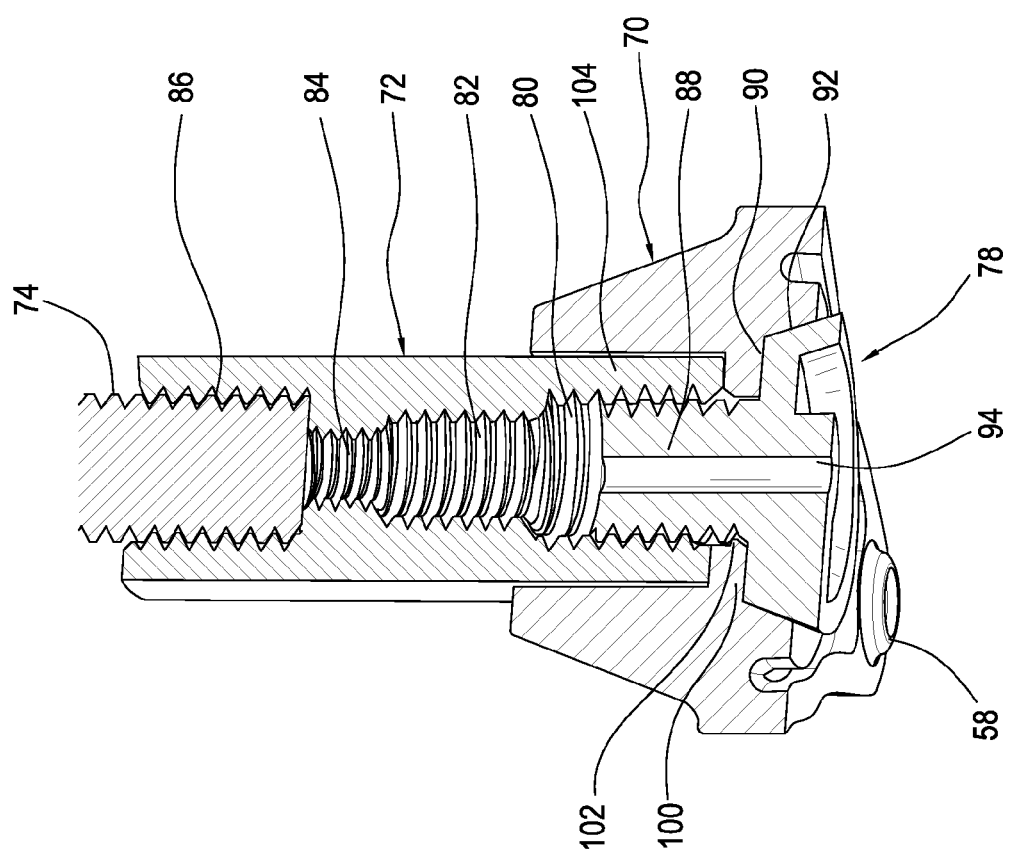
FIG. 10 is an enlarged perspective view, with portions shown in cross-section, of a portion of FIG. 9.

Referring to FIGS. 9 and 10, a coupling assembly 68 embodying the present invention is disclosed. The coupling assembly 68 comprises a base holder 70, a coupler 72 held in the base holder 70, an anchor rod 74 screwed to the coupler 72 and an anchor member 76 threaded to the rod 74. A removable cap 78 is secured to the bottom of the base holder 70 to keep the concrete slurry from flowing into the coupler 72 during concrete pour. The removable cap 78 also serves to hold the coupler 72 to the base holder 70 by drawing the coupler 72 against the bottom wall 100 as shown in FIG. 10. The bottom wall 100 is thereby sandwiched between the bottom end of the coupler 72 and the flange 90 of the cap 78.

The coupler 72 is hexagonal in cross-section on the outside and includes a plurality of threaded bores 80, 82 and 84 of different diameters to allow connection of different size threaded rod (after the concrete has dried and the formboard 6 and cap 78 are removed). The coupler 72 further includes a threaded bore 86 for threadedly receiving the anchor rod 74.

Figure 11:
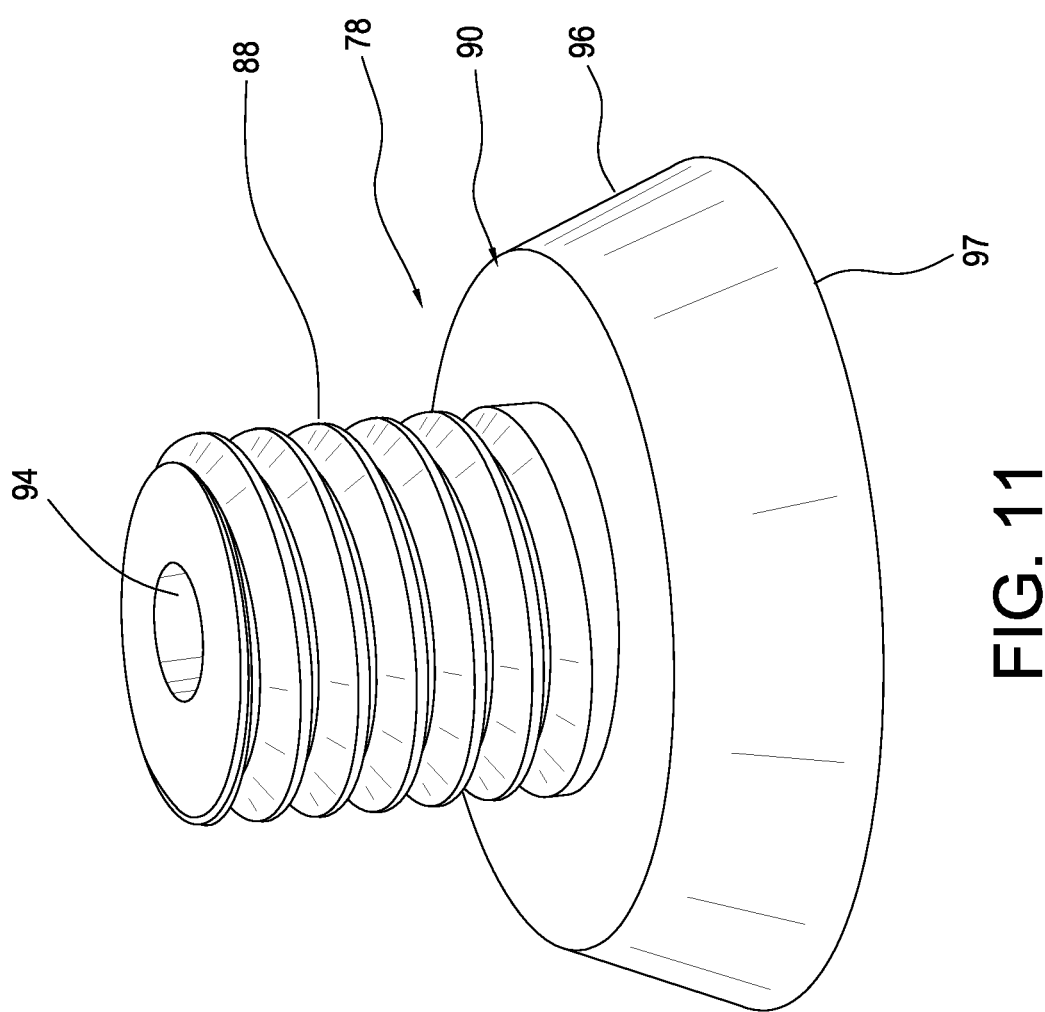
FIG. 11 is an enlarged perspective of a cap used in the coupling assembly of FIG. 10.

Referring to FIG. 11, the cap 78 has a threaded stem 88 that is temporarily threaded into the bore 80 to seal the interior of the coupler 72 from the concrete slurry during concrete pour. The cap 78 includes a flange 90 that seats against a bottom surface 92 of the base holder 70. A vent hole 94 axially disposed through the flange 90 and the stem 88 advantageously allows air to escape from the interior of the coupler 72 when the cap 78 is being installed. The flange 90 includes a conical surface 96 for a good seal against a similarly shaped surface on the bottom surface of the base holder 70. The bottom edge 97 of the cap 78 is preferably aligned with the bottom edge of the ridges 58 so that the base holder 70 may be placed even with the forming surface of the formboard 6. The cap 78 may be color coded to indicate the rod size and/or type of thread of the bores. The cap 78 may be used to secure the coupler 72 to the base holder 70.

The edge portion 28, the skirt 66 and the cap 78 each provides the means for preventing entry of the concrete slurry into the threaded bores during a concrete pour.

Figure 12:
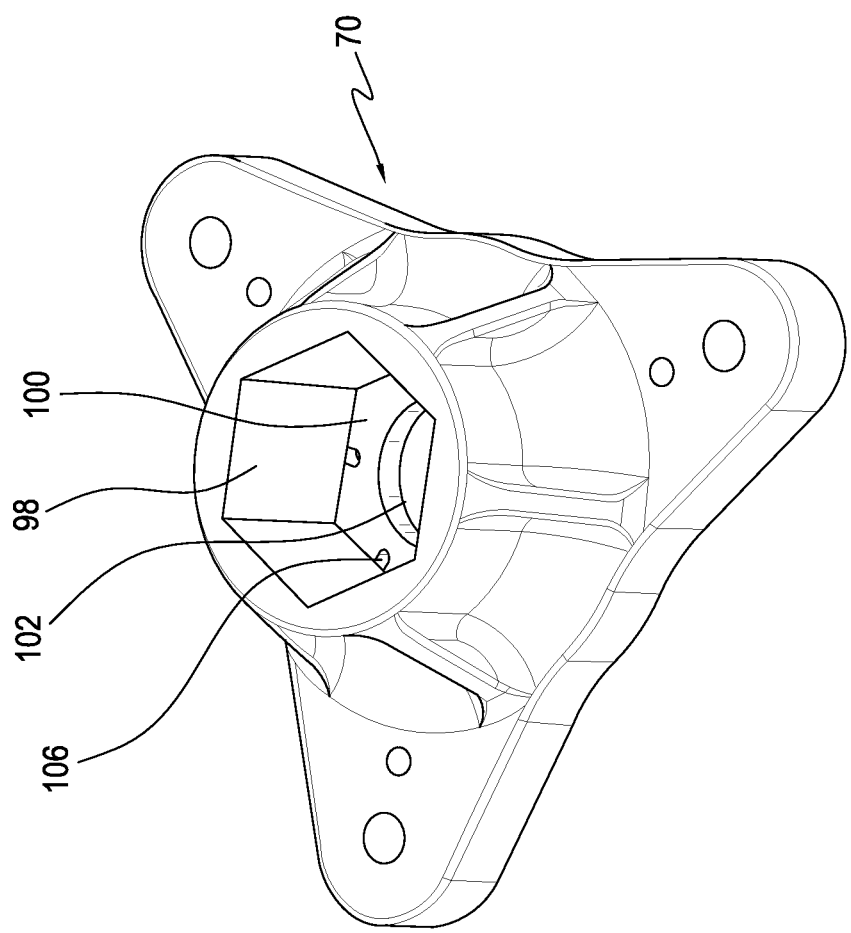
FIG. 12 is a perspective view of a base holder used in the coupling assembly of FIG. 9.
Figure 13:
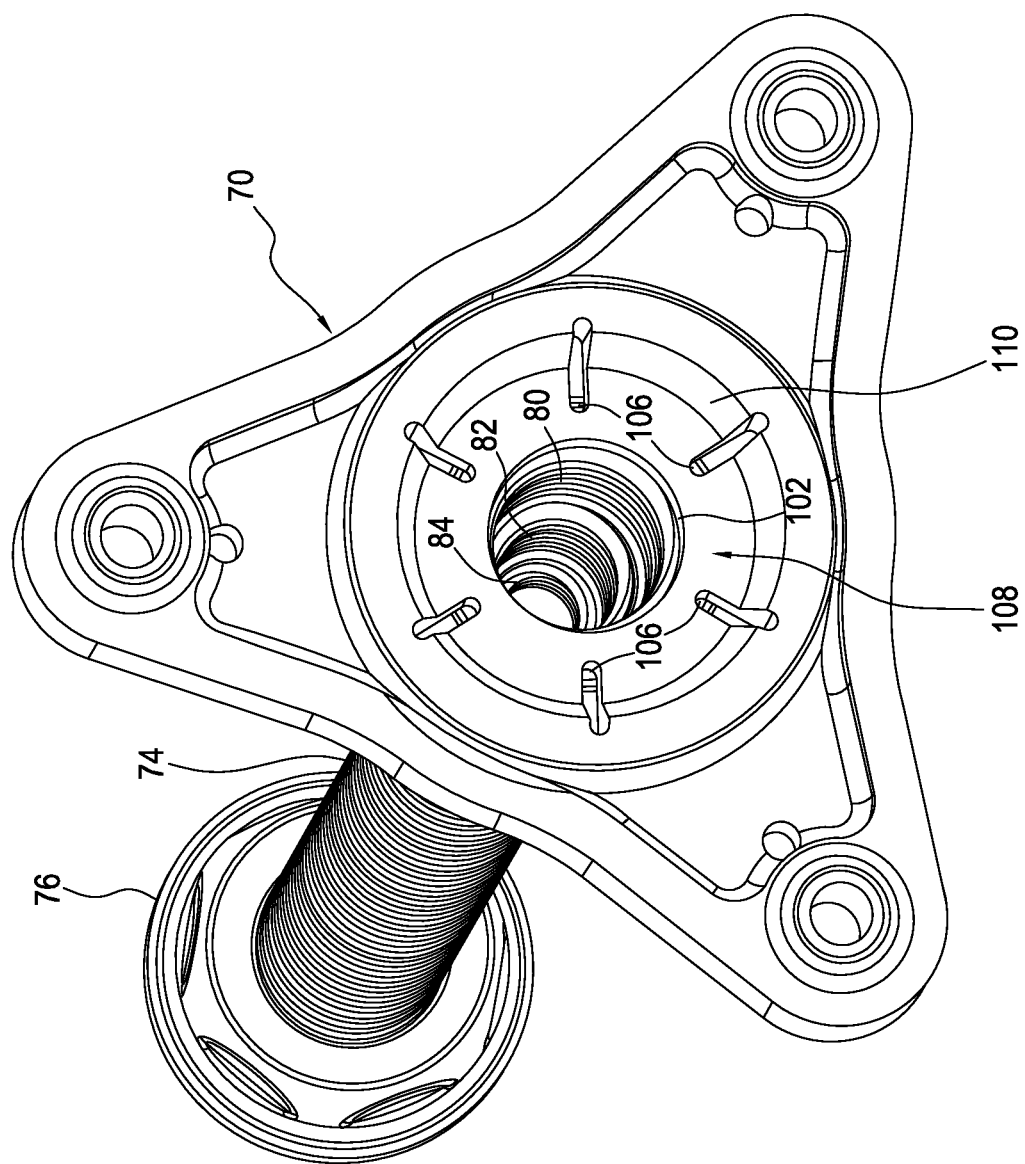
FIG. 13 is a perspective view of the coupling assembly of FIG. 9, showing the cap removed and the various sized threaded bores inside the coupling.

Referring to FIGS. 12 and 13, the base holder 70 is similar to the base holder 4 (see FIG. 4), except that a hexagonal recess 98 is provided with bottom wall 100 having an opening 102. An end portion 104 (see FIG. 10) is configured to be received and attached within the recess 98 by interference fit, glue, or by means of the stem 88 of the cap 78. Holes 106 provide venting for any air that may be trapped during assembly of the coupler 72 to the base holder 70. The bottom surface 108 of the base holder 70 includes conical surface 110 that substantially mates with the conical surface 96 of the cap 78 to substantially seal the interior of the coupler 72 from the concrete slurry. The opening 102 is sized to allow an anchor rod to be threaded to the largest threaded bore 80 of the coupler 72.

It should be understood that the coupler 72 is not limited to a hexagonal cross-section. For example, a cylindrical cross-section is just as applicable. Accordingly, in the case of a cylindrical coupler, the opening 98 in the base holder 70 is understood to be replaced with a matching cylindrical opening.

Figure 14:
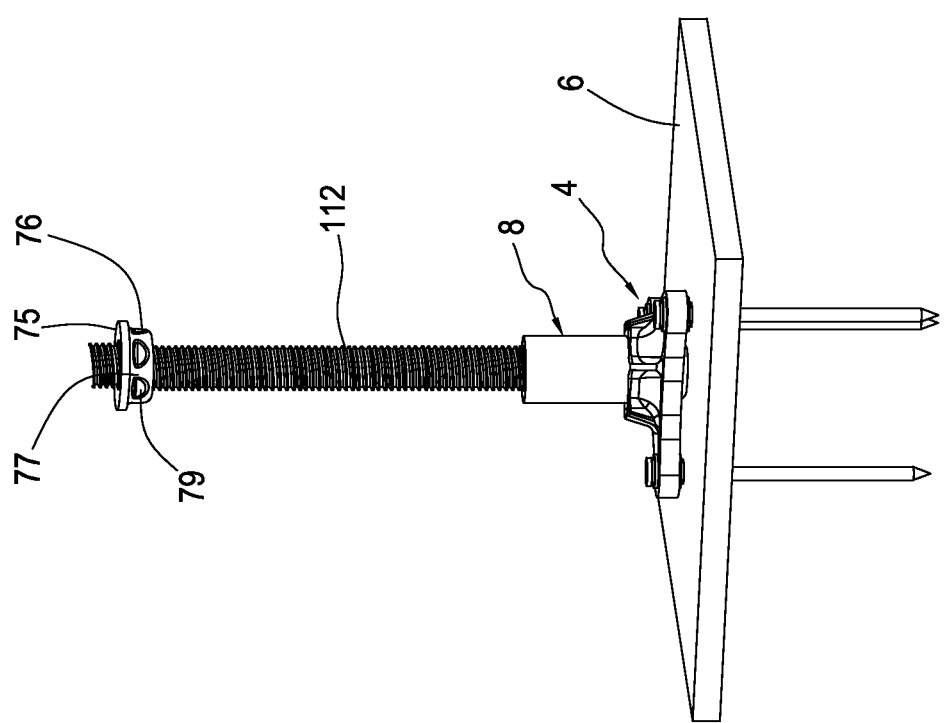
FIG. 14 is a perspective view of a coupling assembly similar to FIG. 1 that uses a threaded rod and an anchor member in place of the bolt.

Referring to FIG. 14, the anchor body 10, which is a standard bolt, shown in FIG. 1, is replaced with a threaded rod 112 and an anchor member 76. The anchor member 76 is circular in plan view and tapered in side view. The anchor member 76 has a circular flange base 75 at its wider portion and tapers to its narrower end with a convex surface 77 cut with a plurality of flat faces 79. The flange base 75 makes a shoulder 81 with the convex surface 77. The anchor member 76 without the faces 79 is disclosed in co-pending application Ser. No. 12/656,624 ('624 application), filed Feb. 4, 2010, herein incorporated by reference. Other anchor bodies disclosed in the '624 application may be used in place of the anchor member 76. The use of the anchor member 76 allows for vertical adjustment as dictated by the expected load on the coupling assembly. Placing the anchor member 76 further away from the forming surface of the formboard 6, and hence the face of the concrete would provide a greater load capacity to the coupling assembly. A standard hexagonal nut may also be used to replace the anchor member 76.

Figure 15:
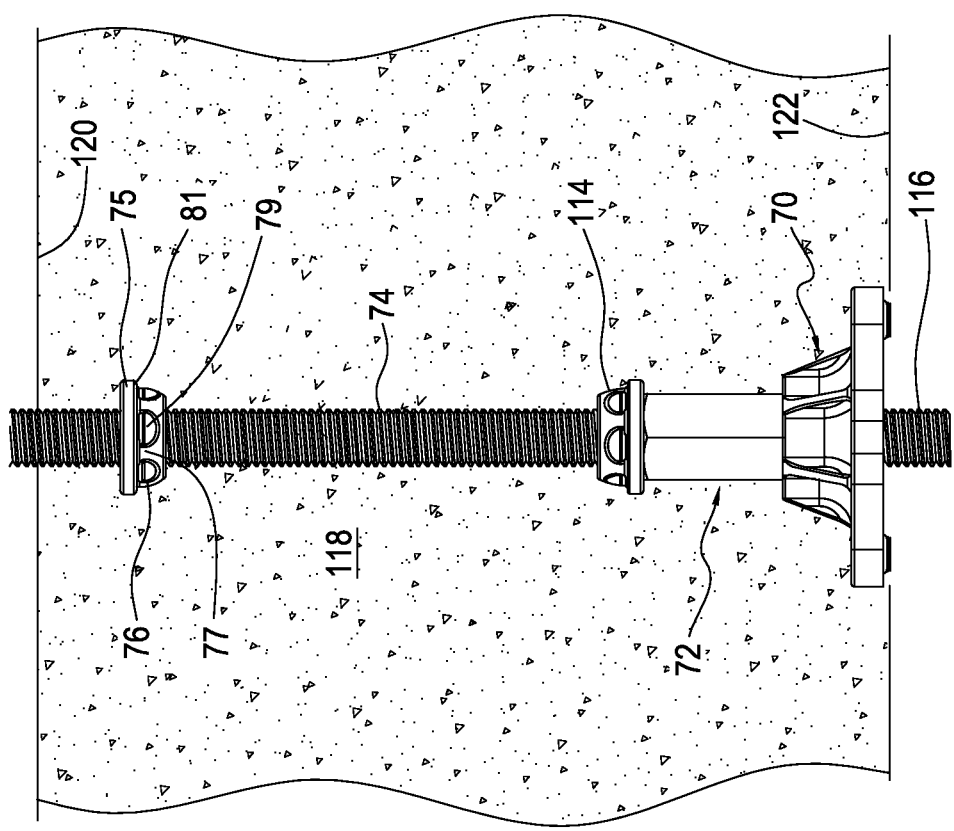
FIG. 15 is a side elevational view of a coupling assembly used to support load above and below the concrete.

Referring to FIG. 15, the coupling assembly 68 of FIG. 9 is modified with the addition of another anchor member 114 disposed tight against the top coupler 72. The anchor member 114 is identical to the anchor member 76, but disposed as a mirror image of the anchor member 76. An anchor rod 116 is shown threaded to one of the threaded bores in the coupler 72. The embodiment shown in FIG. 15, after being embedded in concrete 118 will have the rod 74 extending beyond the top surface 120 of the concrete and the rod 116 beyond the bottom surface 122 of the concrete. The embodiment shown may be used to anchor a load attached to the rod 74 above the concrete and a load attached to the rod 116 below the concrete. Accordingly, this arrangement anchors a load that tends to pull the rod in a direction away from the base holder, while at the same time able to resist another load pulling in the opposite direction.

Figure 16:
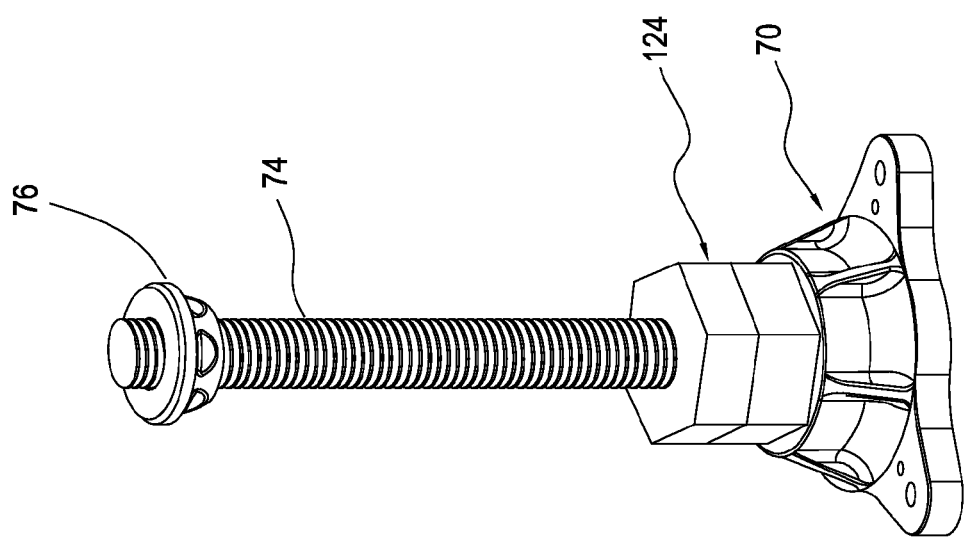
FIG. 16 is a perspective view of another embodiment of a coupling assembly using a split nut coupling.
Figure 17:
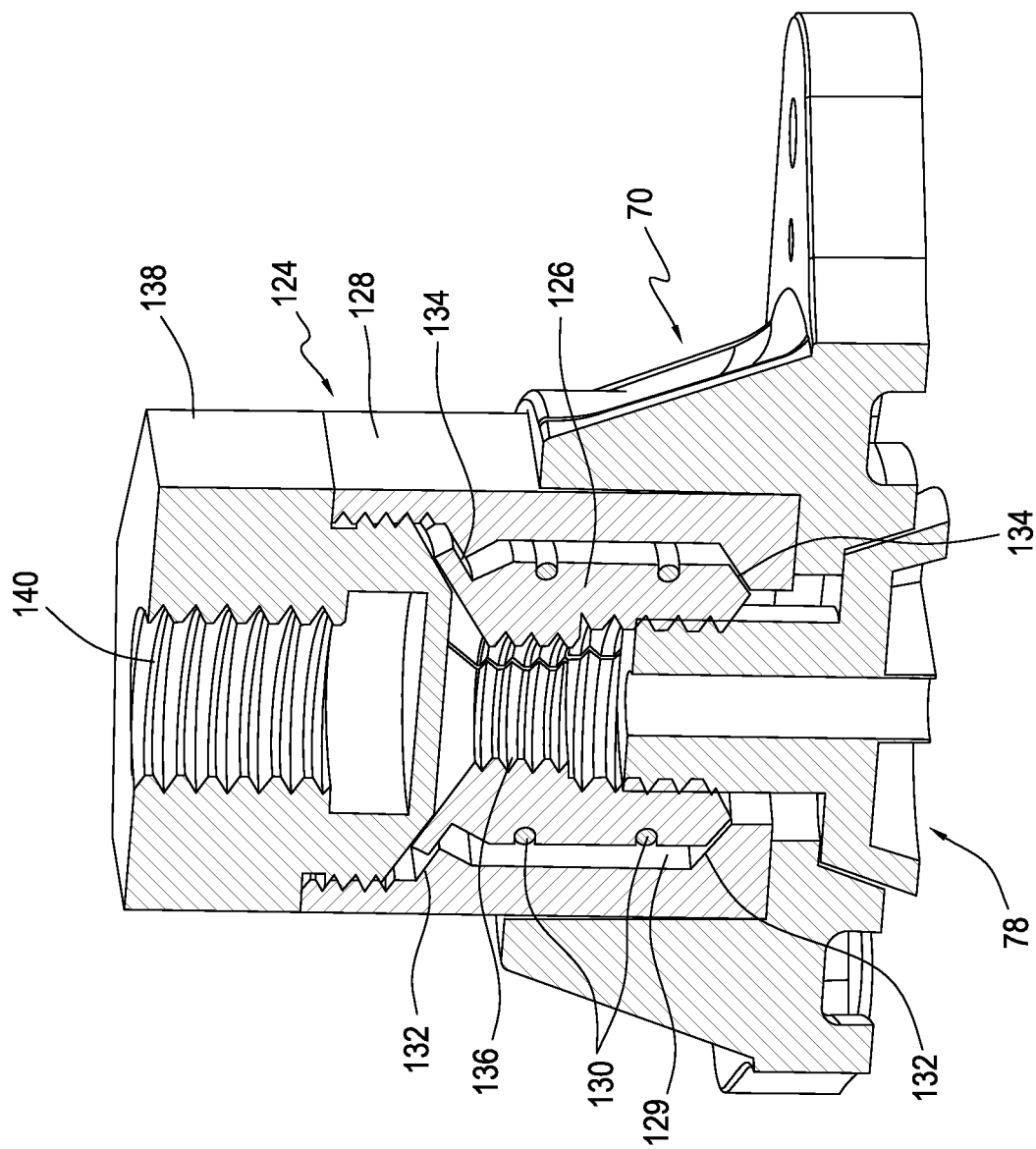
FIG. 17 is a perspective view with portions shown in cross-section of the coupling assembly (with the threaded rod and anchor member removed) of FIG. 16, showing the internal details of the split nut.

Referring to FIGS. 16 and 17, the coupler 72 has been replaced with a split nut assembly 124. The split nut assembly 124 includes a split nut 126 disposed within a housing 128. Spacing 129 around the split 126 allows the split nut to expand outwardly when the rod 116 is forced upwardly into the split nut. The split nut 126 is held together by C-rings 130. The housing 128 includes conical surfaces 132 that cooperate with conical surfaces 134 to pull the threads 136 tight against the threads of the rod 116 (see FIG. 15) when a load is applied and pulls the split nut 126 downwardly (when the cap 78 is removed and replaced with the rod 116). A cap nut 138 is threadedly secured to the housing 128. A threaded hole 140 is used to secure the rod 74.

The split nut 126 expands and contracts when relative force is applied. The C-rings 130 hold the threaded split nut 126 together in a contracted position. When a mating threaded rod 116 is pushed into the split nut 126, the segments of the split nut expand outwardly into the spacing 129 to receive the rod within the split nut without rotational motion of the rod. Once the threads are aligned and any force is relieved, the segments of the split nut 126 return to a contracted position to engage around the newly introduced threads. This allows the threaded rod 116 or bolt to be pushed into engagement, without rotation, for much faster and safer installation, particularly for overhead and high walls installation of hardware. The ability to quickly push to achieve thread engagement is much easier that aligning threads and rotating the rod.

Figure 18:
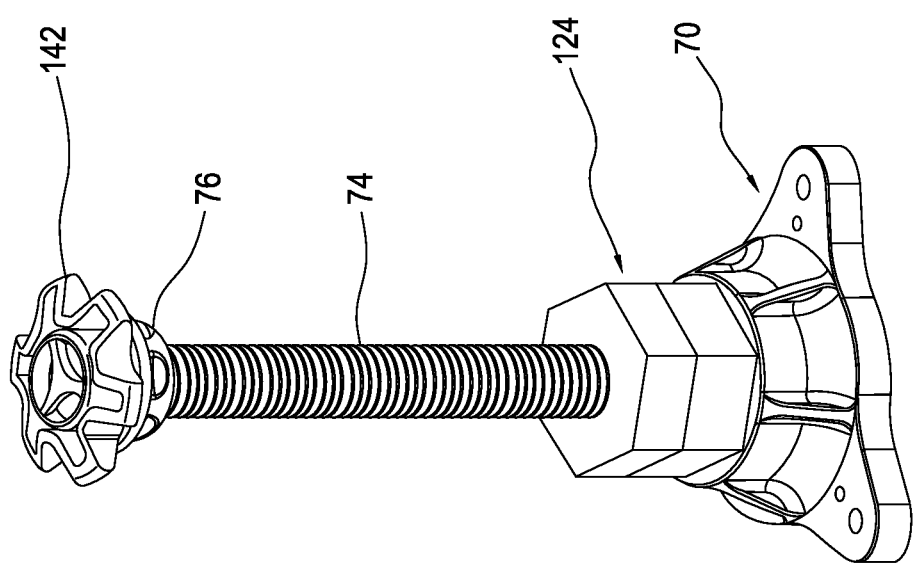
FIG. 18 is a perspective view of a coupling assembly similar to FIG. 16 that includes a checker nut to lock the anchor member in place.

Referring to FIG. 18, a checker nut 142 is used to lock the anchor member 76 to the rod 74. The checker nut 142 is disclosed in co-pending application Ser. No. 61/433,354 and is incorporated herein by reference. A standard hexagonal nut may also be used in lieu of the checker nut 142.

Figure 19:
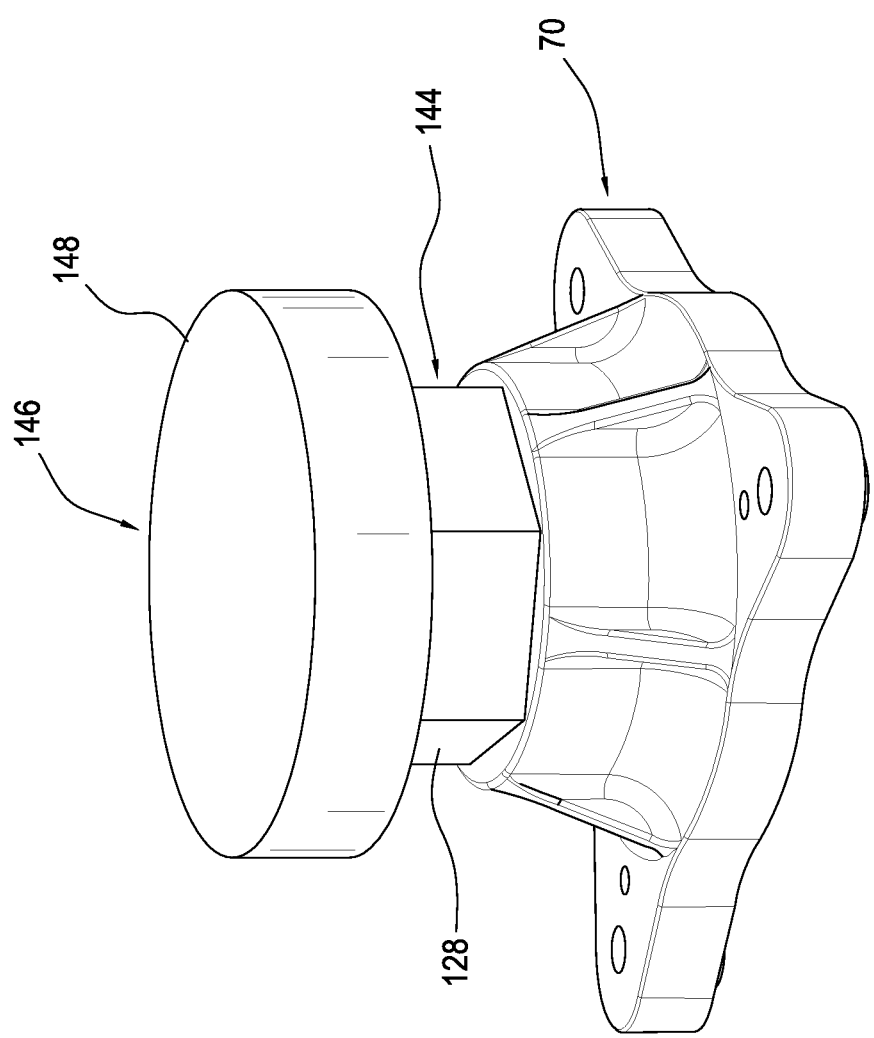
FIG. 19 is a perspective view of another embodiment of a coupling assembly using a different split nut.
Figure 20:
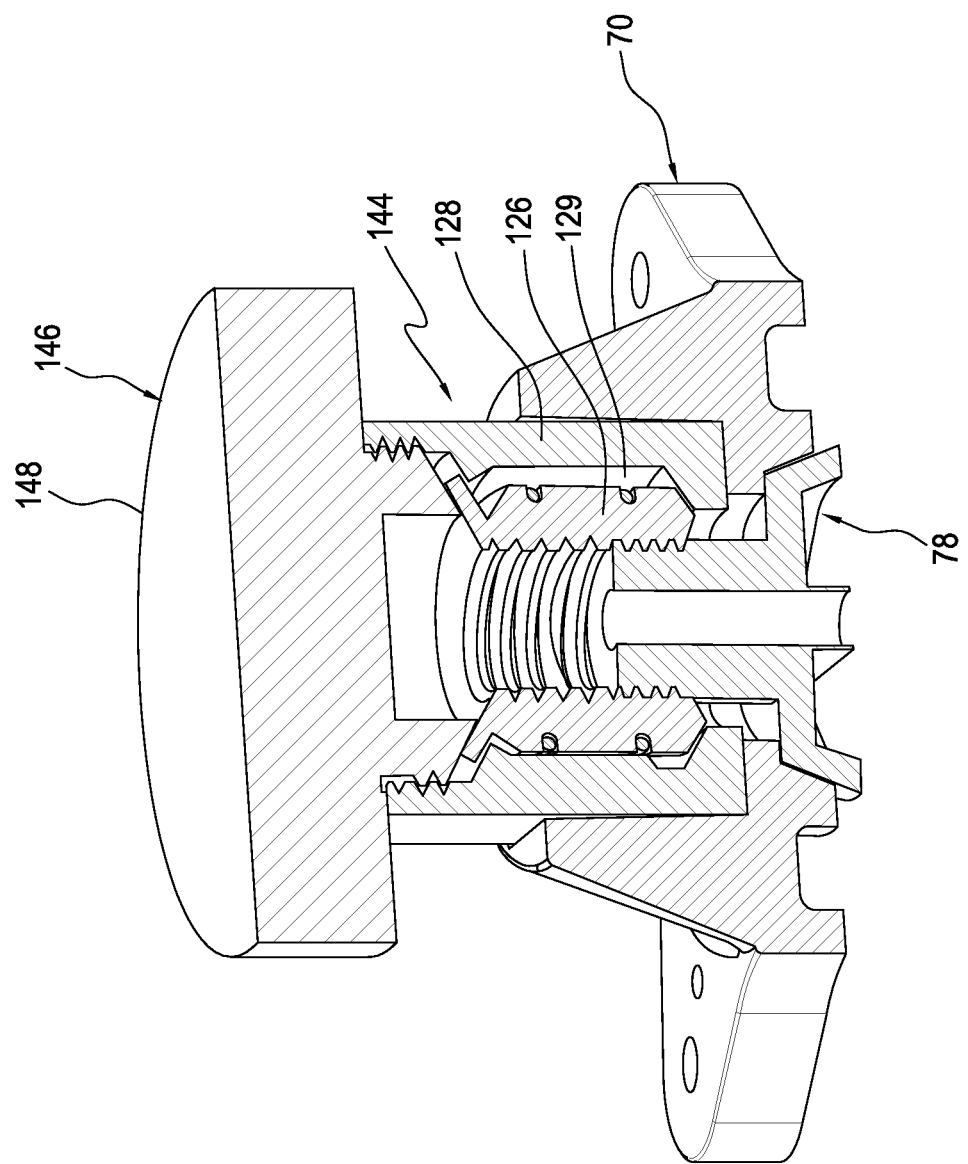
FIG. 20 is a perspective view with portions shown in cross-section of the coupling assembly of FIG. 19.

Referring to FIGS. 19 and 20, a split nut assembly 144 replaces the split nut assembly 124 of FIG. 17. An anchor body 146 replaces the cap nut 138. The anchor body 146 is threaded into the housing 128 and includes a flange head 148 that provides the function of the anchor member 76. The flange head 148 extends beyond the periphery of the housing 128 to provide the necessary surface area to resist the downward pull of a load on the rod 116 threaded to the split nut 126.

Figure 23:
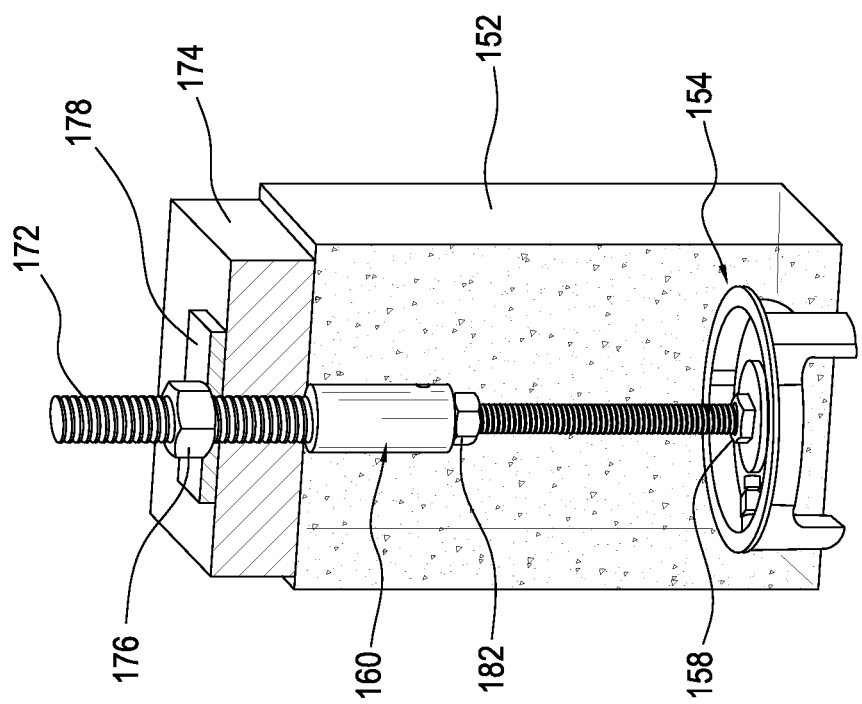
FIG. 23 is a perspective view similar to FIG. 21, showing a nut in place of a checker nut to lock the coupling to the rod.

Referring to FIGS. 21-23, a coupling assembly 150 for securing a load, such as a wall structure, to a concrete foundation 152 is disclosed. The coupling assembly 150 includes a holder 154, an anchor rod 156 secured to the holder 154, an anchor member 158, such as a standard nut, threaded to the rod 156, and a coupler 160 threaded secured to the rod 156. Generally, a foundation is poured into a form the bottom surface of which may be dirt, sand, gravel, etc. Accordingly, it should be understood that the forming surface in this context is the dirt, sand, gravel, etc. that forms the bottom surface of the form and on which the holder 154 is placed.

The holder 154 is disclosed in co-pending application Ser. No. 12/656,623, filed Feb. 4, 2010, herein incorporated by reference. The holder 154 may also be of standard design that elevates the bottom end of the rod 156 a certain distance above the lower exterior surface of the concrete structure to comply with building code requirements. A checker nut 162 may be used to lock the coupler 160 to the rod 156 to minimize movement during construction or when the concrete is vibrated.

The top edge 164 of the coupler 160 is located so as to be accessible, such as being flush, with respect to the top 166 of the concrete foundation to facilitate the troweling or finishing of the concrete slurry. The coupler 160 has a threaded bore 168, which threadedly receives the threaded rod 156. The coupler 160 further includes another threaded bore 170, which threadedly receives the end portion of a tie-rod 172, which extends through a base plate 174, and a bearing plate 176. A hexagonal nut 178 secures the tie-rod to the bearing plate 176. The checker nut 162, as disclosed in the '354 application, may be replaced with a standard hexagonal nut 182, as shown in FIG. 23. A sight hole 180 provides a check on the depth of penetration of the rod 156 into the coupler body to insure that sufficient number of threads are engaged between the coupler 160 and the rod 156. The diameter of the bore 168 is preferably smaller than the diameter of the bore 170 to advantageously allow a larger diameter tie-rod 172 for a larger load. The smaller diameter bore 168 may be used for a smaller diameter tie-rod 156 suitable for the load. The length of the bore 168 is configured so it may be used to receive the tie-rod 156 of the same diameter.

Figure 24:
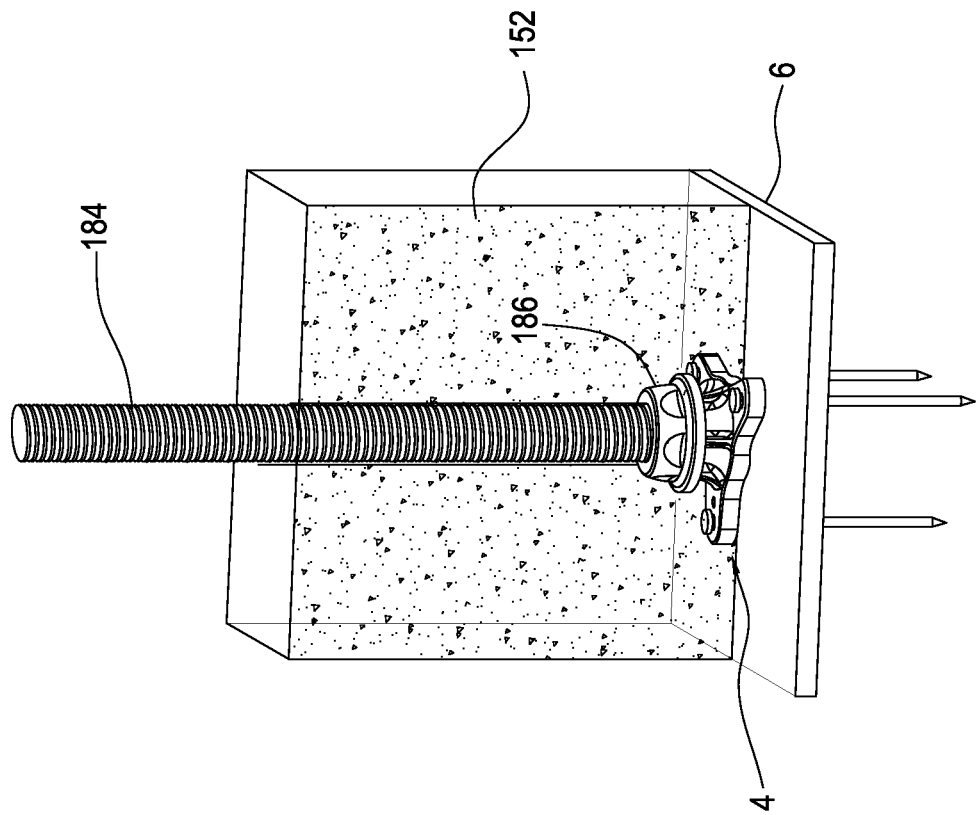
FIG. 24 is a perspective view of a concrete anchor assembly using the base holder of FIG. 6.
Figure 25:
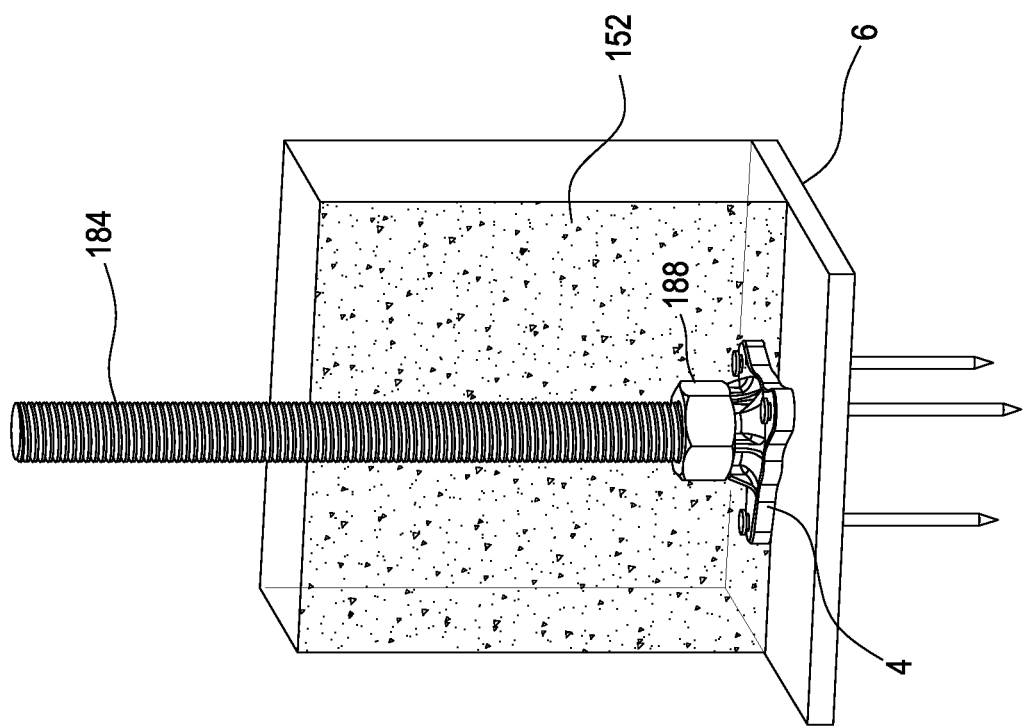
FIG. 25 is a perspective view of a concrete anchor assembly similar to FIG. 24, using a nut in place of an anchor member.

Referring to FIGS. 24 and 25, the base holder 4 with the stopping member 64, shown in FIG. 6, is used as a holder to an anchor rod 184 and an anchor member 186, which may be replaced with a standard hexagonal nut 188. Although not show, it should be understood that the coupler 160 may be threaded to the rod 184 with the top of the coupler being accessible, such as flush with the top of the concrete, as shown in FIGS. 21 and 22. The use of the base holder 4 is particularly advantageous where the bottom of the form is sand, in which case the recessed area 54 at the bottom of the base holder 4 fills up with sand when the base holder 4 is forced down, thereby securing the base holder 4 in place.

It should be understood that the orientation of the coupling assemblies disclosed herein may be varied from the vertical orientation shown in the drawings. The coupling assemblies, for example, may be oriented horizontally for an application requiring an anchor in a wall.

Figure 26:
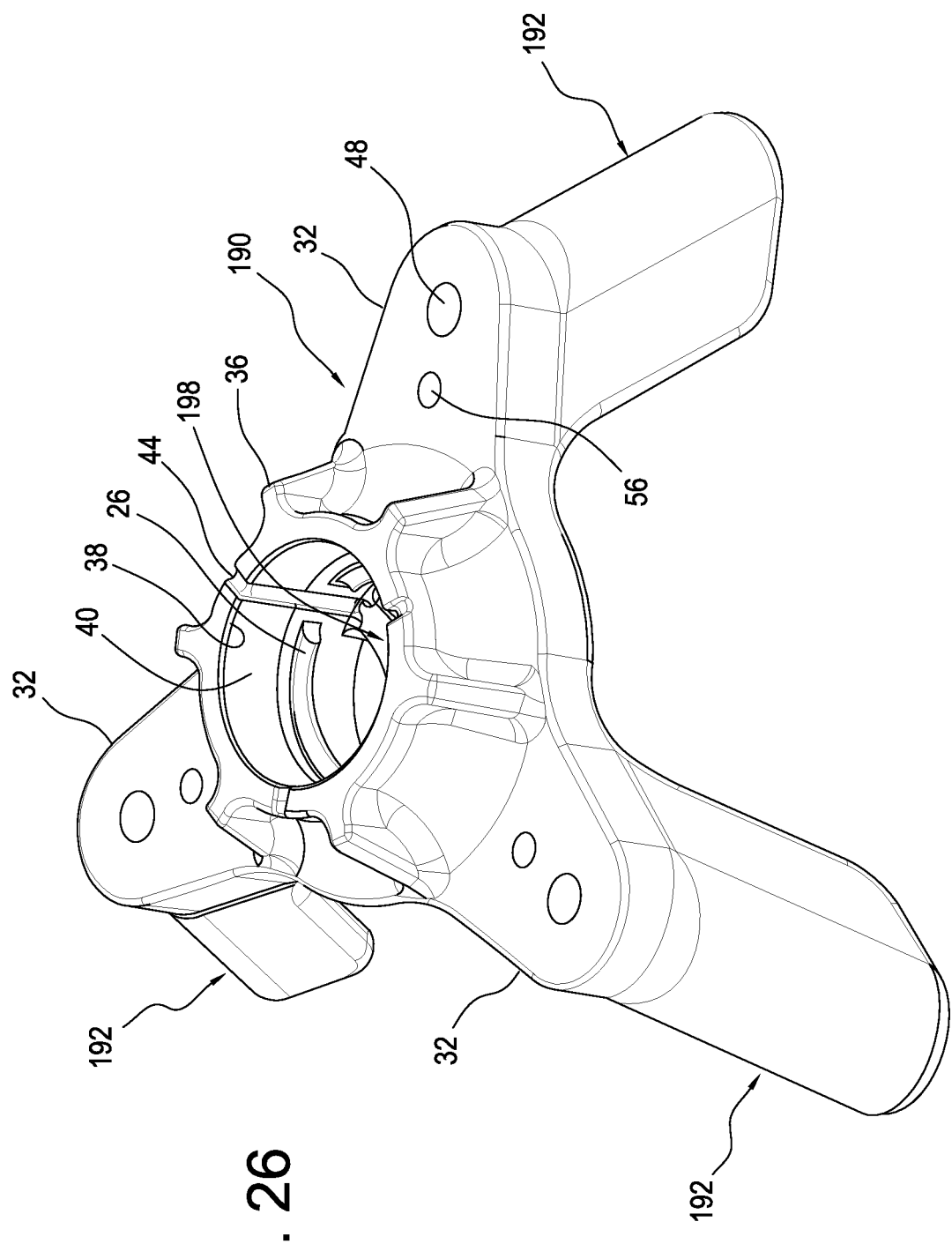
FIG. 26 is a perspective view of an embodiment of an anchor rod holder made in accordance with the present invention.

Referring to FIG. 26, the base holder 4 is modified as holder 190 with the addition of leg portions 192 to elevate the arm portions 32 above the forming surface of the formboard 6. The leg portions 192 are advantageously angled outwardly from the central portion 30 for increased stability.

Figure 27:
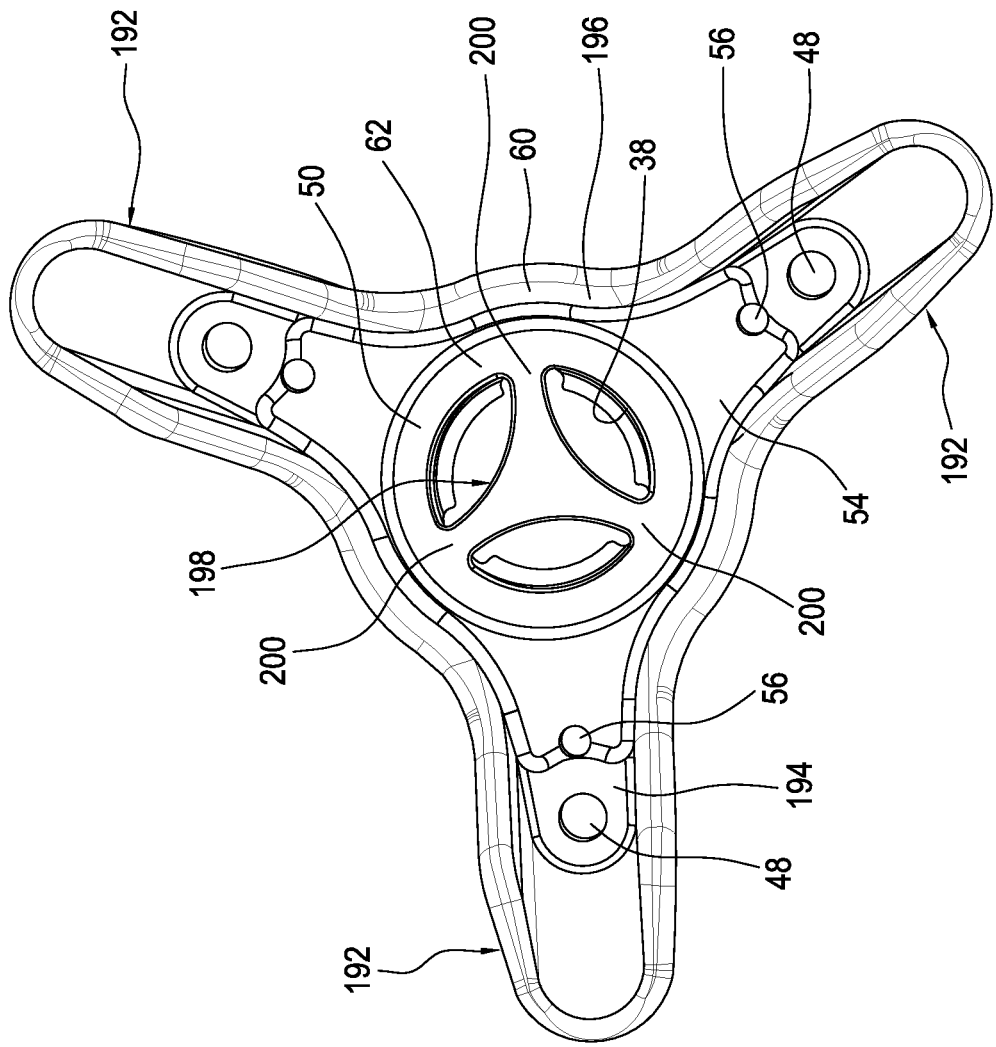
FIG. 27 is a perspective bottom view of FIG. 26.

Referring to FIG. 27, the leg portions 192 are advantageously hollow and U-shaped in cross-section to reduce weight in shipping and use less material in manufacture. The area 194 around the holes 48 is thicker than around the holes 56 to advantageously provide for stronger support for the nails 12 or other securing hardware that use the holes 48. The recessed area 54 and the cavity in the leg portions 192 communicate with the holes 56 to allow air to escape during concrete pour. As in the base holder 4, the surfaces 60 and 62 are on the same level, while the recessed area 54 provides a cavity bounded by the walls 50 and 196. The stop member 64 shown in FIG. 6 is modified to a stop member 198, which is substantially a triangular shape with vertices 200 attached to the cylindrical surface 40 at the bottom of the opening 38. The stop member 198 provides the same function as the stop member 64.

Figure 28:
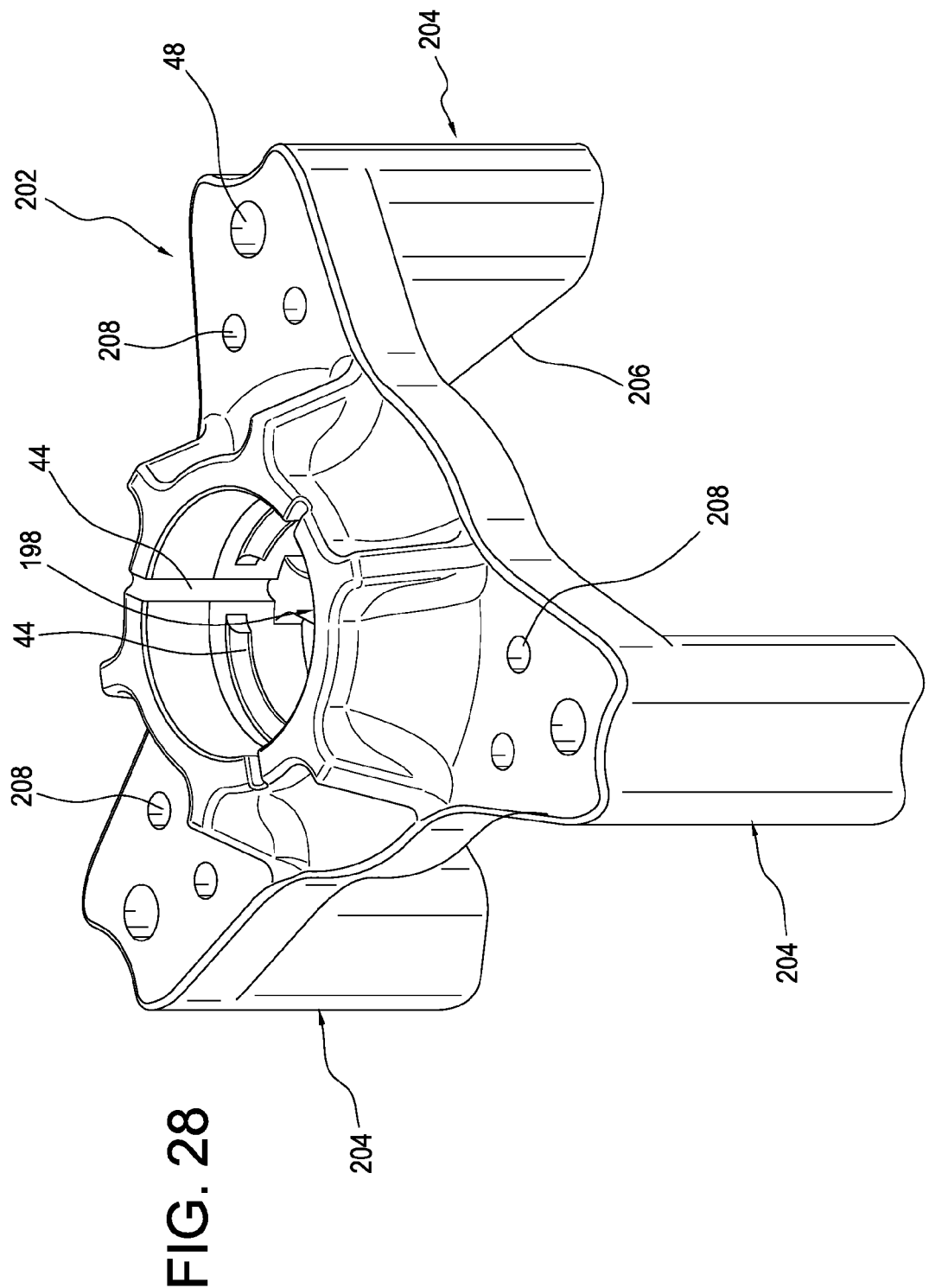
FIG. 28 is a perspective view of an embodiment of an anchor rod holder made in accordance with the present invention.
Figure 29:
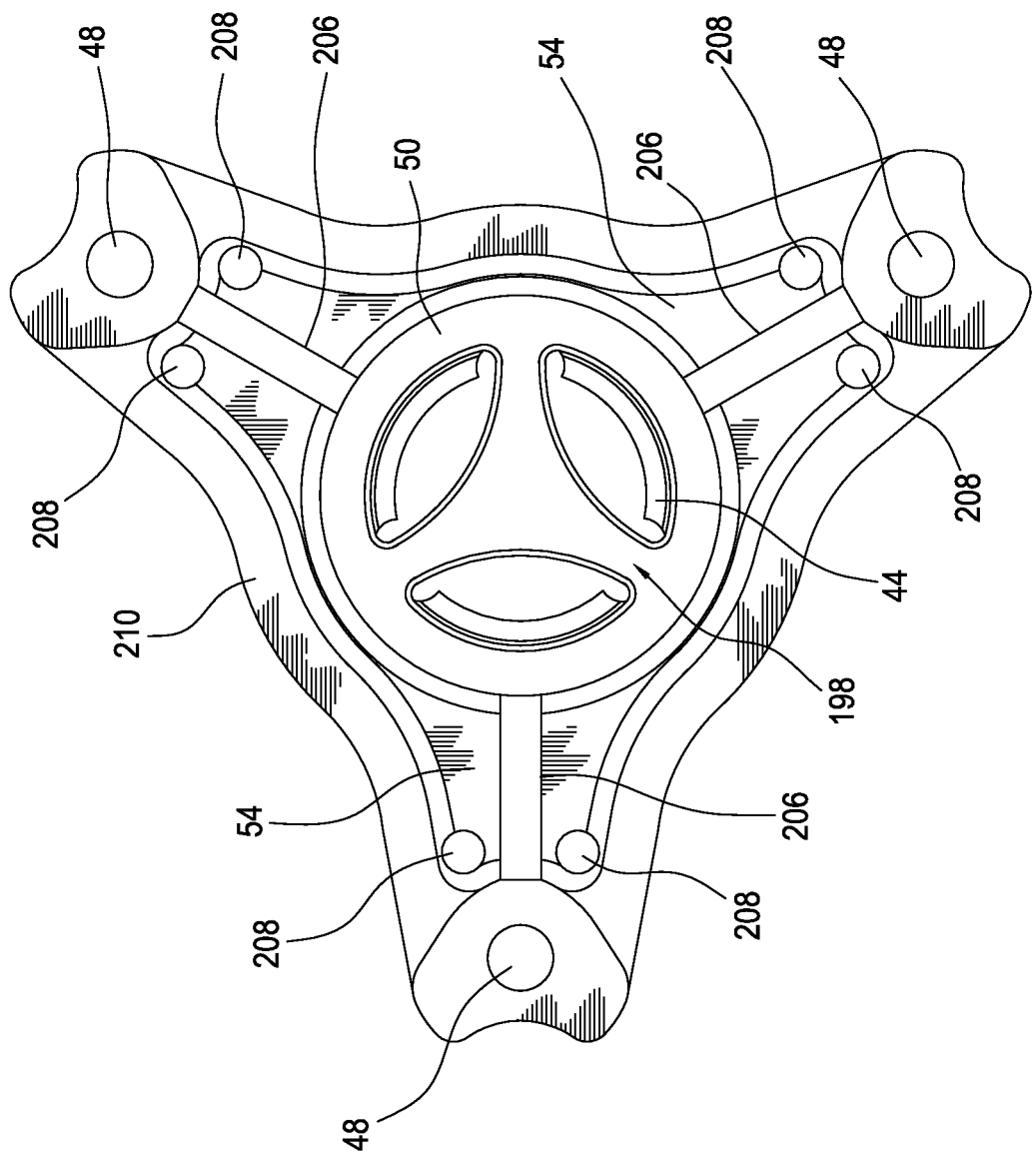
FIG. 29 is a perspective bottom view of FIG. 28.

Referring to FIGS. 28 and 29, a holder 202 is disclosed, which is similar to the holes 190, except that the leg portions 204 are not angled but proceed vertically. The leg portions are solid and include the openings 48 for the nails 12, screws or other attaching hardware. Ribs 206 provide additional rigidity to the legs portions 204. The ribs 206 are substantially triangular with one side attached to the recessed area 54 and the other side to the leg portion 204. Openings 208 are provided to vent the recessed areas 54 bounded by the walls 210, 50 and the ribs 206.

The holders 190 and 202 are used for applications shown in FIGS. 21-23 when it is required to space the bottom end of the rod 156 (see FIG. 21) above the forming surface of the formboard and the resulting concrete surface for code requirement.

Figure 30:
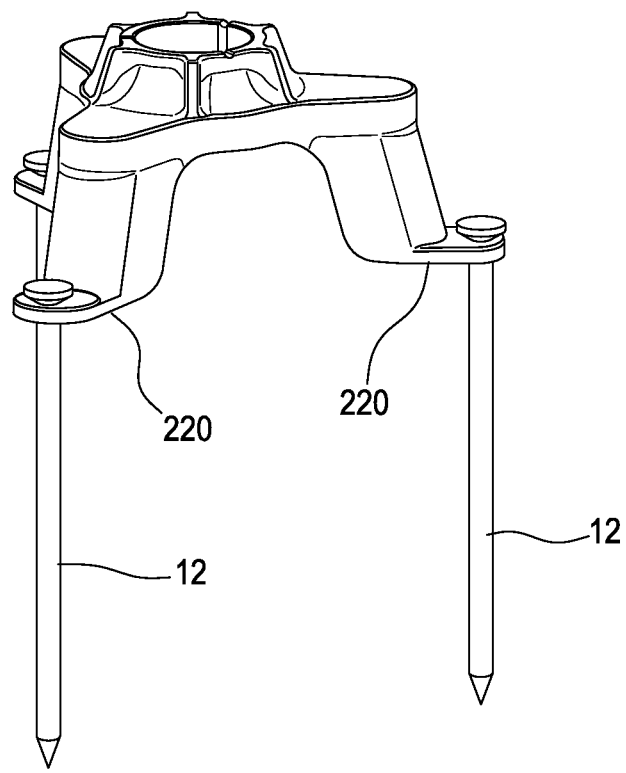
FIGS. 30 and 31 are perspective views of another embodiment of an anchor rod holder made in accordance with the present invention, with portions shown in cross-section (FIG. 31).
Figure 31:
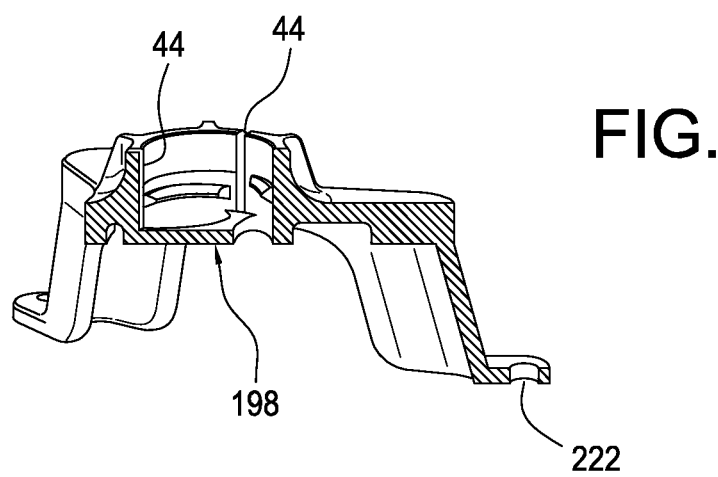

Referring to FIGS. 30 and 31, the rod holder of FIG. 26 is modified with the addition of foot portions 220 that extend laterally away from the bottom portion of the leg portions 192. The foot portions 220 each includes an opening 222 for receiving therethrough the nails 12. The addition of the foot portions 220 provides additional areas for attaching the base holder to the formboard with the nails 12 or other securing hardware or it may be used to replace the opening openings 48. The modification to the holder of FIG. 26 may also be made to the base holder of FIG. 28.

The foot portions 220 are preferably made of thin material that would easily shear off from the leg portions 192 when the formboard 6 is removed. The heads of the nails 12 while still attached to the foot portions 220 will advantageously break the foot portions 220 when the formboard 6 is removed, taking the nails with it, after the concrete has cured. Other ways of making the foot portions 220 to easily break off may be used, such as scoring the foot portions 220 across their widths between the bottom of the leg portions 192 and the nailheads, or scoring across the openings 222.

Figure 5:
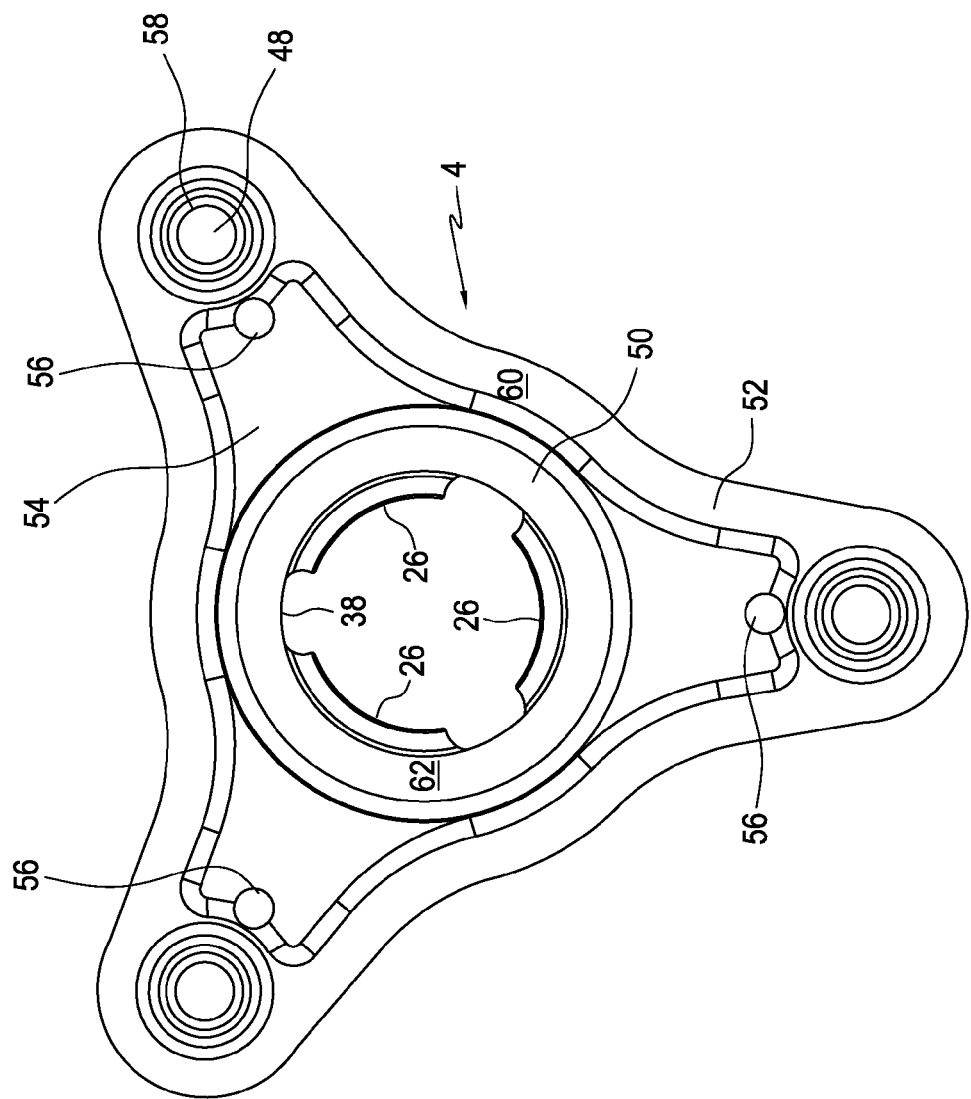
FIG. 5 is a bottom view of FIG. 4.
Figure 32:
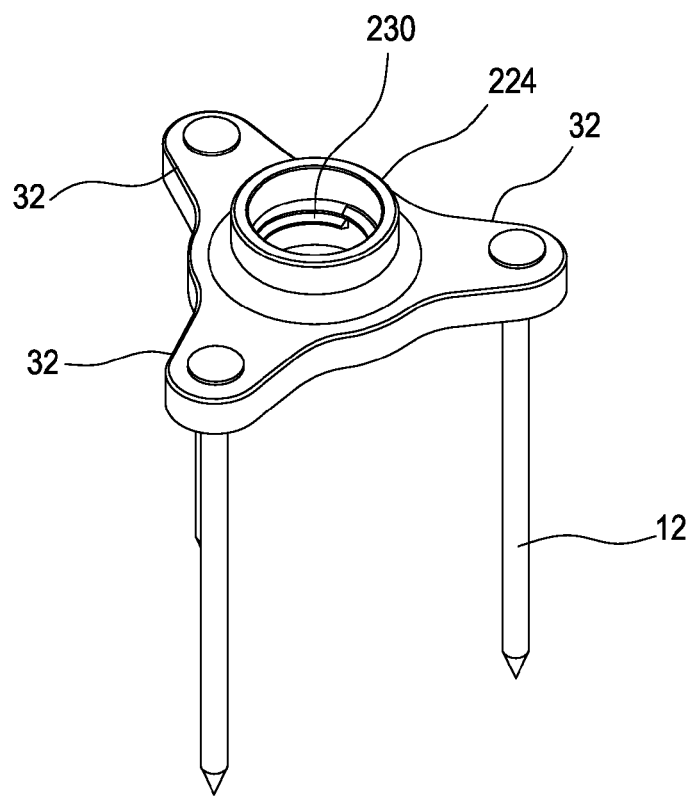
FIGS. 32-34 are perspective views of additional embodiments of a base holder, with portions shown in cross-section (FIGS. 33 and 34).
Figure 33:
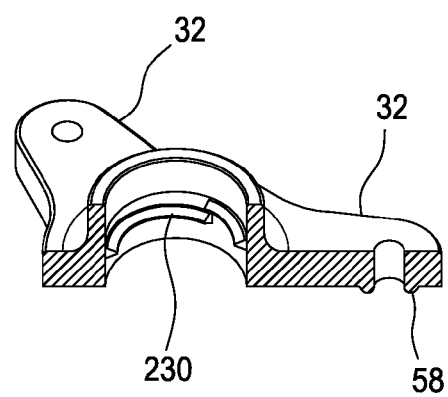
Figure 34:
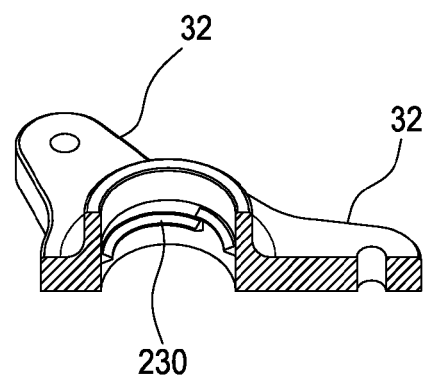

Referring to FIGS. 32-34, the base holder disclosed above in the various figures may be modified by eliminating the rib portions 36, providing a generally tubular central portion 224 to provide support to a coupler or treaded rod. The ridge portion 58 may also be removed, as shown in FIG. 34, where the base holder is not required to be spaced from the forming surface of the formboard, such as shown in FIG. 24. The stop member 198 has been eliminated. Further, in this embodiment, the thread portion 230 is continuous, which may also be applied to the other embodiments of the base holder to replace the segmented threads 26. The arm portions 32 may be solid as shown or hollow as shown in FIG. 5.

Figure 35:
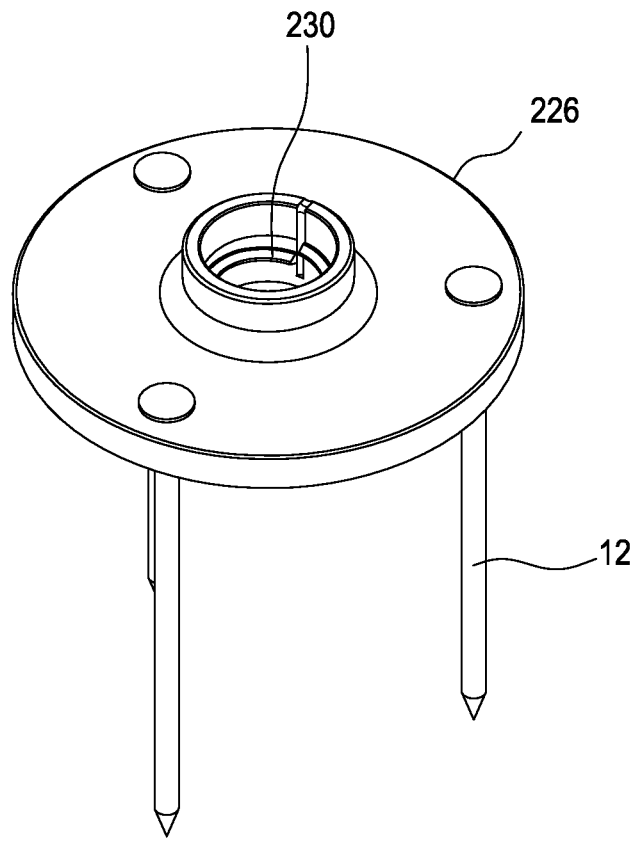
FIGS. 35 and 36 are perspective views of another embodiment of a base holder, with portions shown in cross-section (FIG. 36).
Figure 36:
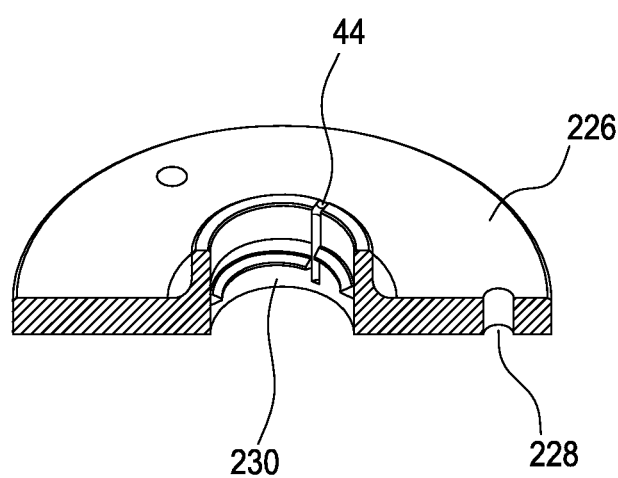

Referring to FIGS. 35 and 36, the base holder of FIGS. 32-34 may be modified by making the arm portions 32 into a circular base portion 226 with openings 228 for the nails 12. The base portion 226 may be solid, as shown, or hollow (see FIG. 40). The vent channel 44 is provided where the continuous thread 230 begins and ends.

Figure 37:
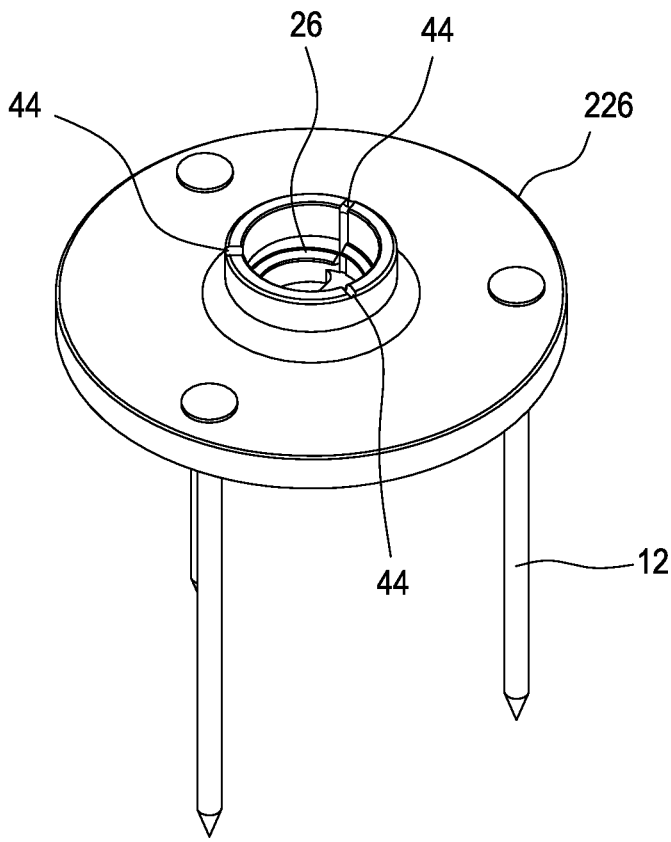
FIGS. 37 and 38 are perspective views of another embodiment of a base holder, with portions shown in cross-section (FIG. 38).
Figure 38:
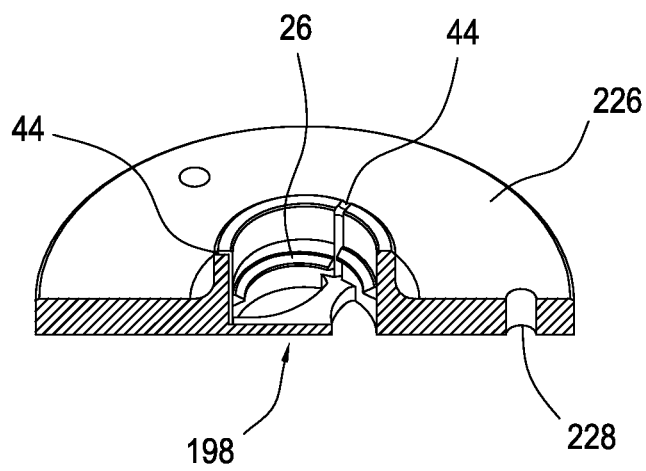

Referring to FIGS. 37 and 38, the embodiment of FIG. 35 is modified with the addition of the stop member 198. Segmented thread portions 26 replace the continuous thread 230.

Figure 39:
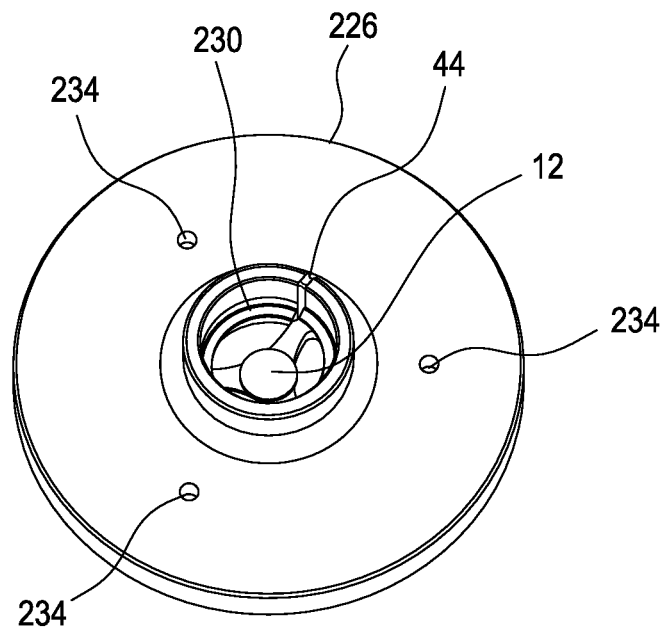
FIGS. 39 and 40 are perspective views of another embodiment of a base holder, with portions shown in cross-section (FIG. 40).
Figure 40:
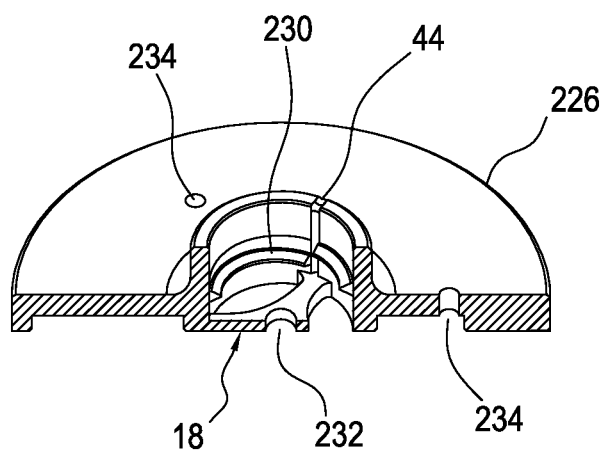
Figure 41:
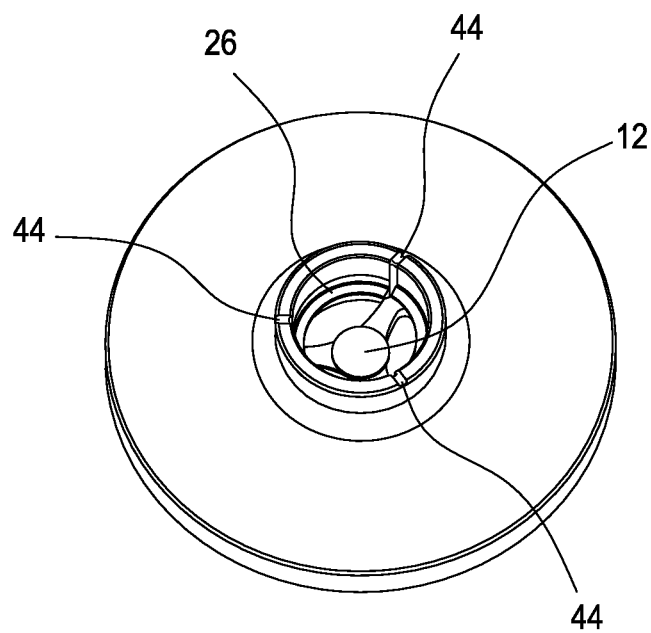
FIGS. 41 and 42 are perspective views of another embodiment of a base holder, with portions shown in cross-section (FIG. 42).
Figure 42:
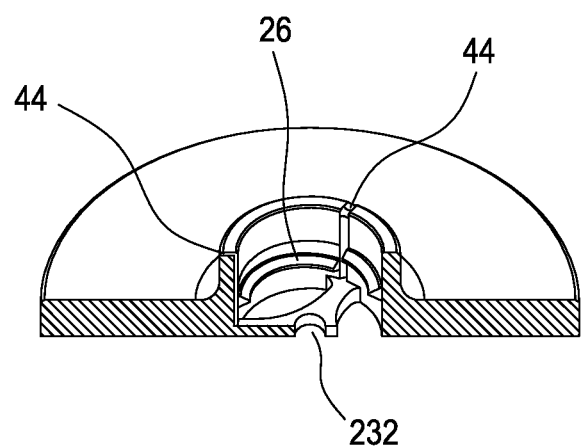

Referring to FIGS. 39 and 40, the stop member 198 is provided with a central opening 232 for the nail 12. Other openings 234 are also provided to allow any trapped air underneath the base 226 to escape and for receiving additional nails 12.

Figure 43:
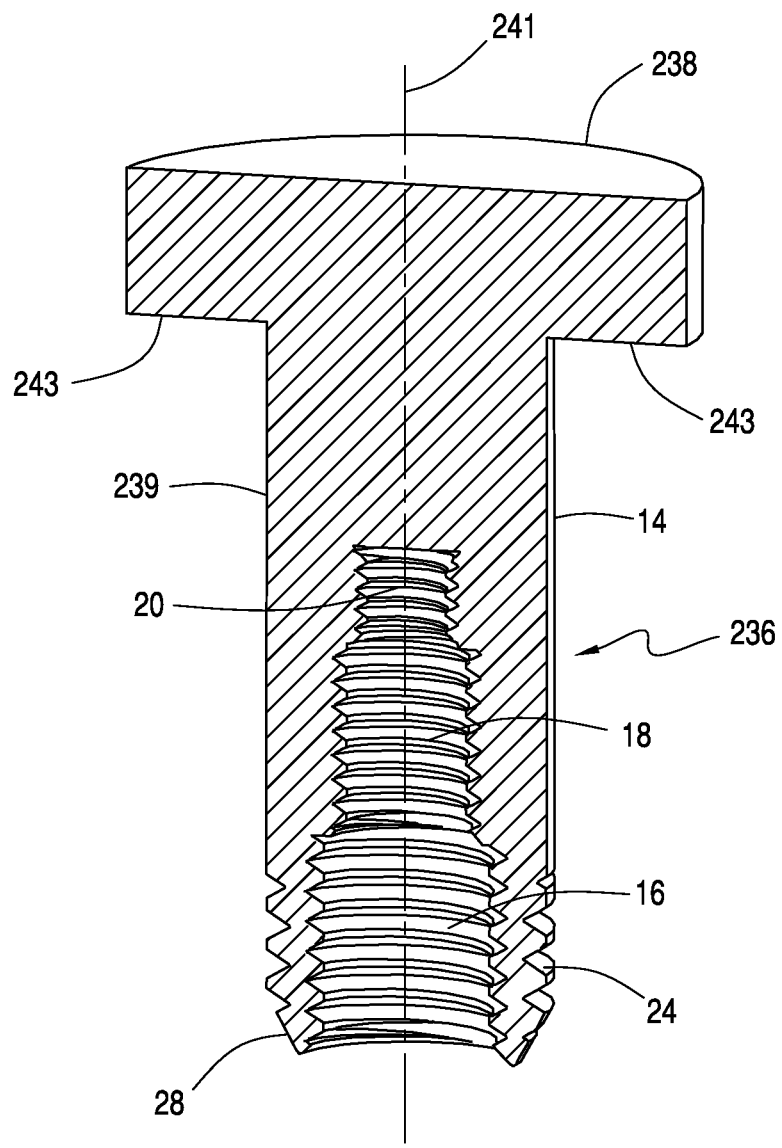
FIG. 43 is a perspective cross-sectional view of an anchor coupler.

Referring to FIG. 43, the coupler 8 and the separate anchor body 10 shown in FIG. 1 may be integrated into one unit as anchor coupler 236. The anchor coupler 236 includes the outside cylindrical surface 14, the plurality of concentric threaded axial bores 16, 18 and 20, exterior male threads 24 with the edge portion 28. The anchor coupler 236 further includes an integrated anchor head 238, which may be circular, hexagonal or any other shape.

The anchor coupler 236 includes a body portion 239 having a longitudinal axis 241. The anchor head 238 has shoulder portions 243 extending substantially transversely to the axis 241. The shoulder portion 243 provides the anchoring function when embedded in concrete.

Similar to the coupler 72 shown in FIG. 10, the anchor coupler 236 may be made without the exterior threads 24. Further, the outside cylindrical surface 14 may use a different cross-sectional shape, such as hexagonal. Without the exterior threads 24, the anchor coupler 236 is attached to the base holder 4 by friction fit or with the use of the removable cap 78. The cap 78 holds the anchor coupler 236 against the bottom wall 100 of the base holder 70. The length of the anchor coupler 236 may be lengthened or shortened, depending on the need to place the anchor head 238 deeper or shallower inside the concrete structure where it will be embedded to provide more or less holding power as dictated by the load to which it will be subjected.

Figure 44:
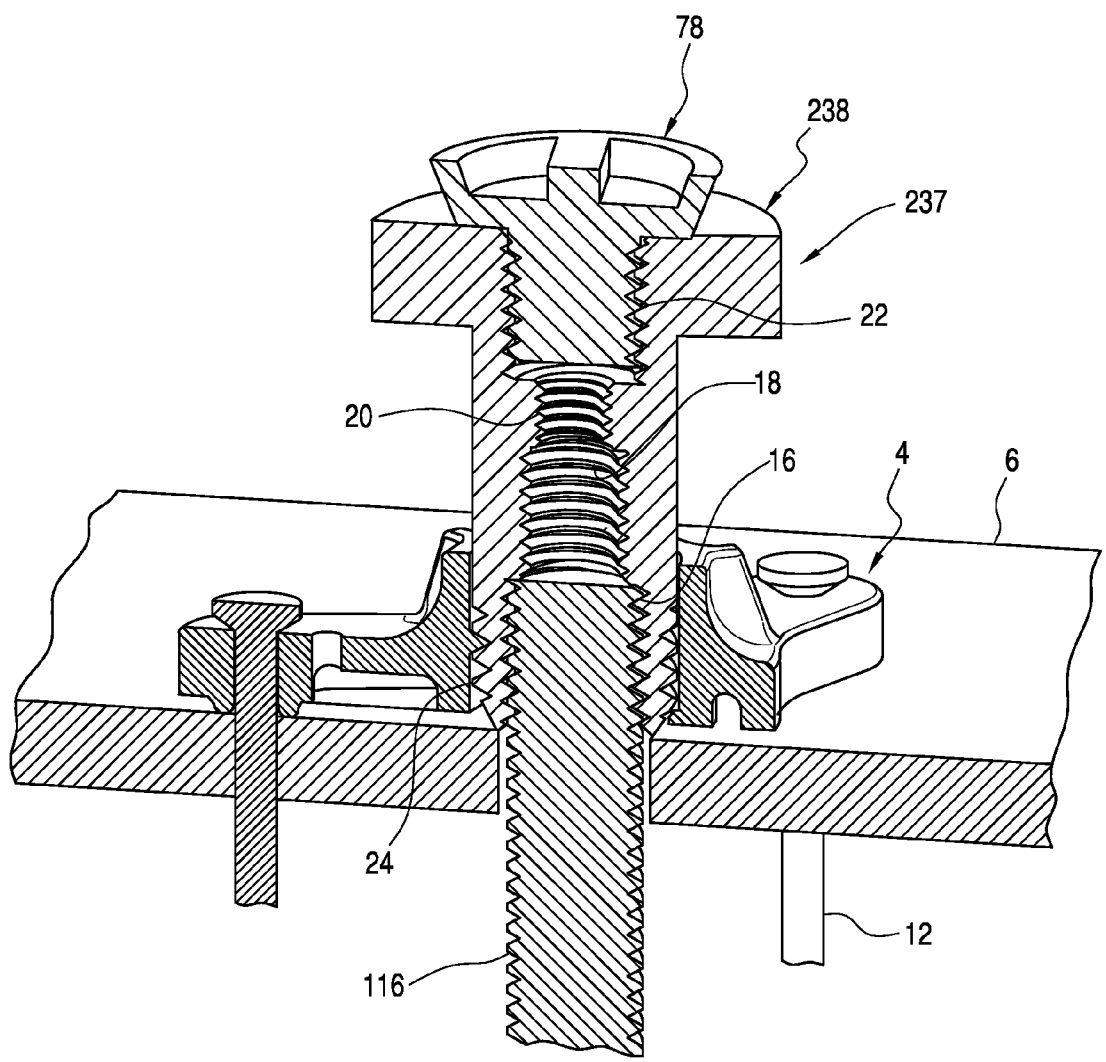
FIG. 44 is a perspective cross-sectional view of another embodiment of the anchor coupler of FIG. 43 shown held by a base holder.

Referring to FIG. 44, the anchor coupler 236 is modified as anchor coupler 237, which is provided with the axial bore 22 in the same manner as shown for the coupler 8 in FIG. 3. The removable cap 78 may be used to cap the bore hole 22 if the anchor head 238 will be completely embedded in concrete. An anchor rod that is designed to extend beyond the concrete structure in which the anchor coupler 237 will be embedded may be threaded into the hole 22 in place of the cap 78.

Figure 45:
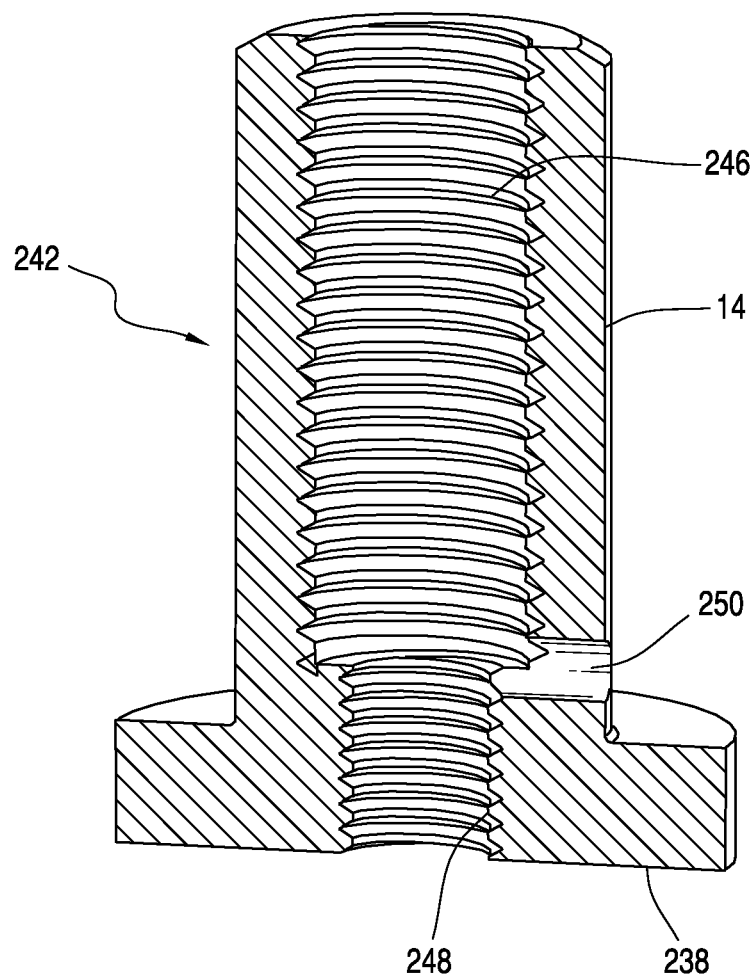
FIG. 45 is a perspective cross-sectional view of another embodiment of the anchor coupler shown in FIG. 43.

Referring to FIG. 45, the anchor coupler 236 is further modified as anchor coupler 242. The anchor coupler 242 does not include the exterior threads 24. The anchor coupler 242 has a threaded bore hole 246 and another bore hole 248 of a different diameter. The bore holes 246 and 248 are preferably concentric. A radial hole 250 communicates with the bore holes 246 and 248 as a way to monitor the extent of penetration of a rod that is threaded into the bore hole 248 and for the rod that would be threaded into the bore hole 246. As in the anchor coupler 236, the exterior cylindrical surface 14 may be a different cross-sectional shape, such as hexagonal.

Figure 46:
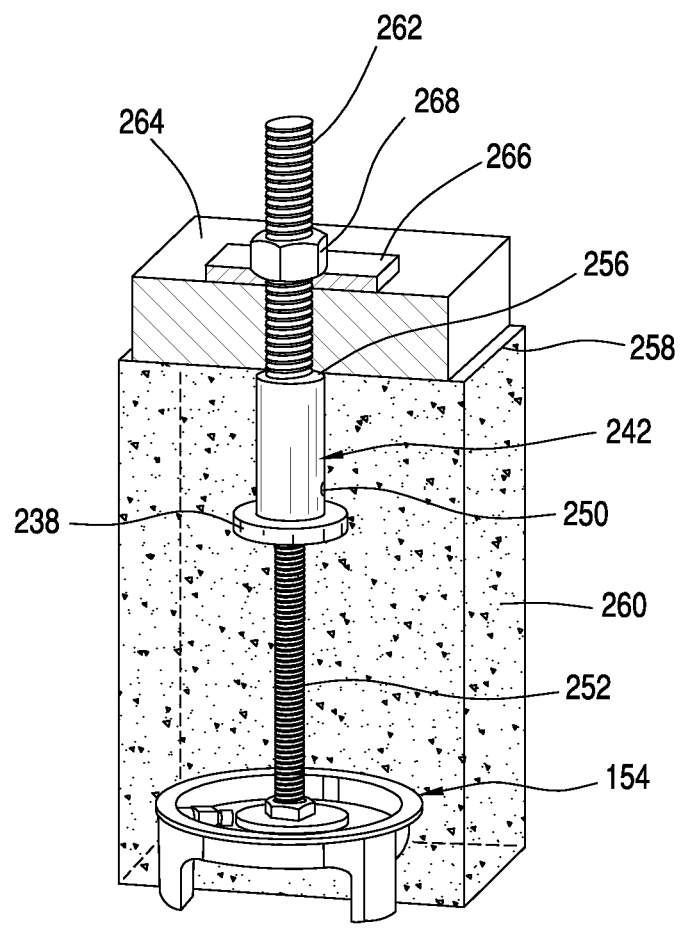
FIG. 46 is a perspective view of the anchor coupler of FIG. 45, shown embedded in concrete.

Referring to FIG. 46, the anchor coupler 242 is installed in concrete in a similar manner shown for the coupler 160 in FIG. 21. A threaded rod 252 is screwed to the threaded bore 248 and is supported by the holder 154. The holder 154 is disclosed in co-pending application Ser. No. 12/656,623, filed Feb. 4, 2010, herein incorporated by reference. The holder 154 may also be of standard design that elevates the bottom end of the rod 252 a certain distance above the lower exterior surface of the concrete structure to comply with building code requirements. A top edge 256 is made accessible, such as being flush with the exterior top surface 258 of the concrete structure 260 where the anchor coupler 242 is embedded. A tie rod 262 is threaded to the bore hole 246 and extends through a bottom plate 264 and a bearing plate 266. A nut 268 presses down on the bearing plate 266 to lock the tie rod 262 in place. The length of the anchor coupler 242 may be varied to position the anchor head 238 more or less deep into the concrete structure, depending on the load to which the anchor coupler will be subjected. It will be appreciated that the separate anchor body 158 shown in FIG. 21 is dispensed with, since its function is now provided by the integrated anchor head 238.

Referring back to FIG. 44, it will be appreciated that the anchor coupler 237 may also be used in a similar way as the anchor coupler 242.

It should be appreciated that the anchor couplers 236, 237 and 242 advantageously incorporate the separate couplers and anchor bodies into one integrated unit.

The base holder 4 and its various embodiments disclosed herein may be made of molded plastic or other suitable material.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A concrete anchor coupling assembly, comprising:
   a) a base holder for being attached to a concrete forming surface, said base holder including a central opening;
   b) a coupler having one end without radial projection, said one end being disposed in said central opening, said one end being accessible with respect to a concrete surface after the concrete is poured, said coupler including a first threaded bore; said first threaded bore being disposed into said central opening; and c) said base holder including a stop member extending into said central opening at a bottom of said central opening to prevent a bottom edge of said coupler from extending beyond said bottom of said central opening.

2. A concrete anchor coupling assembly as in claim 1, wherein:

a) said stop member is integral with said base holder; and b) said base holder and said stop member are molded as one unitary piece.

3. A concrete anchor coupling assembly as in claim 1, wherein said stop member includes an opening.

4. A concrete anchor coupling assembly as in claim 1, wherein said coupler includes a second threaded bore of different diameter from said first threaded bore.

5. A concrete anchor coupling assembly as in claim 4, wherein said coupler includes a third threaded bore.

6. A concrete anchor coupling assembly as in claim 4, and further comprising a removable cap attached to said one end of said coupler.

7. A concrete anchor coupling assembly as in claim 1, and further comprising:

a) a threaded rod attached to said coupler; and b) an anchor body attached to said threaded rod a distance from said coupler.

8. A concrete anchor coupling assembly, comprising:

a) a base holder for being attached to a concrete forming surface, the base holder including a recess, said base holder including legs; and b) a threaded body having an end portion without radial projections, said end portion being disposed within said recess.

9. A concrete anchor coupling assembly as in claim 8, wherein said threaded body is hexagonal in cross-section.

10. A concrete anchor coupling assembly as in claim 8, and further comprising a rod threaded to said threaded body.

11. An anchor as in claim 8, wherein said base holder is molded.

12. A concrete anchor coupling assembly as in claim 8, wherein said recess is hexagonal in cross-section.

13. A concrete anchor coupling assembly as in claim 8, wherein:

a) said base holder includes a central portion and a base portion; and b) a plurality of arm portions extending outwardly and radially from a bottom portion of said central portion.

14. A concrete anchor coupling assembly as in claim 13, wherein said central portion includes an upwardly extending tubular wall.

15. A concrete anchor coupling assembly as in claim 8, wherein:

a) said recess includes a bottom portion; and b) said bottom portion includes an opening.

16. A concrete anchor coupling assembly as in claim 8, wherein said threaded body includes first and second bores having different diameters.

17. A concrete anchor coupling assembly as in claim 8, and further comprising a threaded rod attached to said threaded body.

18. A concrete anchor coupling assembly as in claim 17, and further comprising an anchor body attached to said threaded rod.

19. A concrete anchor coupling assembly, comprising:

a) a base holder for being attached to a concrete forming surface, the base holder including a recess; and b) a threaded body having an end portion without radial projections, said end portion being disposed within said recess;

c) said base holder including a central portion and a base portion; and d) a plurality of arm portions extending outwardly and radially from a bottom portion of said central portion.

20. A concrete anchor coupling assembly, comprising:

a) a base holder for being attached to a concrete forming surface, the base holder including a recess;

b) a threaded body having an end portion without radial projections, said end portion being disposed within said recess; and c) said threaded body including first and second threaded bores having different diameters.

21. A concrete anchor coupling assembly, comprising:

a) a base holder for being attached to a concrete forming surface, the base holder including a recess;

b) a threaded body having an end portion without radial projections, said end portion being disposed within said recess;

c) a threaded rod attached to said threaded body; and d) an anchor body attached to said threaded rod.

* * * * *